United States Patent
Oniishi et al.

[19]

[11] Patent Number: 5,859,845
[45] Date of Patent: Jan. 12, 1999

[54] VEHICLE LOAD CONTROL SYSTEM

[75] Inventors: Tatsuaki Oniishi; Akiyoshi Kanazawa; Nobuhiro Imaizumi, all of Shizuoka, Japan

[73] Assignee: Yazaki Corporation, Tokyo, Japan

[21] Appl. No.: 684,182

[22] Filed: Jul. 19, 1996

[30] Foreign Application Priority Data

| Jul. 19, 1995 | [JP] | Japan | 7-204079 |
| Jul. 19, 1995 | [JP] | Japan | 7-204080 |

[51] Int. Cl.[6] ........................................ H04S 3/00
[52] U.S. Cl. ........................ 370/386; 370/422; 370/438; 307/10.1
[58] Field of Search .................................... 370/366, 386, 370/422, 438; 307/10.1

[56] References Cited

U.S. PATENT DOCUMENTS

| 4,272,790 | 6/1981 | Bates | 386/52 |
| 4,887,263 | 12/1989 | Steely | 370/85.1 |
| 5,150,363 | 9/1992 | Mitchell | 370/282 |
| 5,533,029 | 7/1996 | Gardner | 370/329 |
| 5,550,825 | 8/1996 | McMullan, Jr. et al. | 370/486 |
| 5,592,485 | 1/1997 | Consiglieri et al. | 340/825.06 |

FOREIGN PATENT DOCUMENTS

| 0 504 549 A2 | 9/1992 | European Pat. Off. | H04L 12/28 |
| 0504549 | 9/1992 | European Pat. Off. | H04L 12/28 |
| 2809763 | 9/1979 | Germany | H02J 13/00 |
| 62-12442 | 1/1987 | Japan | B60R 16/02 |
| 62-48836 | 3/1987 | Japan | H04L 11/00 |
| 4-80801 | 3/1992 | Japan | G05B 15/02 |
| 5-55701 | 7/1993 | Japan | B60I 1/00 |
| WO 90/10559 | 9/1990 | WIPO | B60R 16/02 |

OTHER PUBLICATIONS

Newton, H., Newton's Telecom Dictionary, 8th ed. p. 397, 1994.

*Primary Examiner*—Alpus H. Hsu
*Assistant Examiner*—W. Todd Baker
*Attorney, Agent, or Firm*—Sughrue, Mion, Zinn, Macpeak & Seas, PLLC

[57] ABSTRACT

A control signal generated as a result of the actuation of each of control switches of a control section is multiplexed by a multiplexing section, and the thus multiplexed signal is sent to a multiplex transmission line. Load control sections receive the multiplexed control signal sent over the multiplex transmission line. The load control sections then control the electric power fed to a corresponding one of loads on the basis of the received control signal. Control data, representing the form of output control of the corresponding load which is controlled as a result of the actuation of the control switch, are stored according to the control switches. Control means control the electric power fed to the load on the basis of the control signal using the control data.

14 Claims, 38 Drawing Sheets

FIG. 7A

| SWC-1 (USED FOR INPUTTING BOTH SWITCH DATA AND VR DATA) ||||
|---|---|---|---|
| 1 |  | 11 |  |
| 2 | SW-3 (INDICATOR 2) | 12 | SW-3 · VR 3 (ILLUMINATION) |
| 3 | SW-3 (SIGNAL 1) | 13 | SW-3 · VR 3 (GND) |
| 4 | SW-3 (SIGNAL 2) · VR 3 (SIGNAL) | 14 | SW-3 · (INDICATOR 1) |
| 5 | SW-2 (INDICATOR 2) | 15 | SW-2 · VR 2 (ILLUMINATION) |
| 6 | SW-2 (SIGNAL 1) | 16 | SW-2 · VR 2 (GND) |
| 7 | SW-2 (SIGNAL 2) · VR 2 (SIGNAL) | 17 | SW-2 · (INDICATOR 1) |
| 8 | SW-1 (INDICATOR 2) | 18 | SW-1 · VR 1 (ILLUMINATION) |
| 9 | SW-1 (SIGNAL 1) | 19 | SW-1 · VR 1 (GND) |
| 10 | SW-1 (SIGNAL 2) · VR 1 (SIGNAL) | 20 | SW-1 · (INDICATOR 1) |

FIG. 7B

| SWC-5 (SWITCH DATA INPUT ONLY) ||||
|---|---|---|---|
| 1 |  | 11 |  |
| 2 | SW-15 (INDICATOR 2) | 12 | SW-15 (ILLUMINATION) |
| 3 | SW-15 (SIGNAL 1) | 13 | SW-15 (GND) |
| 4 | SW-15 (SIGNAL 2) | 14 | SW-15 (INDICATOR 1) |
| 5 | SW-14 (INDICATOR 2) | 15 | SW-14 (ILLUMINATION) |
| 6 | SW-14 (SIGNAL 1) | 16 | SW-14 (GND)) |
| 7 | SW-14 (SIGNAL 2) | 17 | SW-14 (INDICATOR 1) |
| 8 | SW-13 (INDICATOR 2) | 18 | SW-13 (ILLUMINATION) |
| 9 | SW-13 (SIGNAL 1) | 19 | SW-13 (GND) |
| 10 | SW-13 (SIGNAL 2) | 20 | SW-13 (INDICATOR 1) |

FIG. 17

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| 00H | DATA STRUCTURE | | | | | | | | |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | \multicolumn{2}{c|}{DEFAULT CONTROL} | A - IPS1 |
| | \multicolumn{8}{c|}{CORRESPONDING SWITCH VOLUME DATA ADDRESS} | |
| | DATA STRUCTURE | | | | | | | | |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | \multicolumn{2}{c|}{DEFAULT CONTROL} | A - IPS |
| | \multicolumn{8}{c|}{CORRESPONDING SWITCH VOLUME DATA ADDRESS} | |
| | DATA STRUCTURE | | | | | | | | |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | \multicolumn{2}{c|}{DEFAULT CONTROL} | B - IPS1 |
| | \multicolumn{8}{c|}{CORRESPONDING SWITCH VOLUME DATA ADDRESS} | |
| | DATA STRUCTURE | | | | | | | | |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | \multicolumn{2}{c|}{DEFAULT CONTROL} | B - IPS |

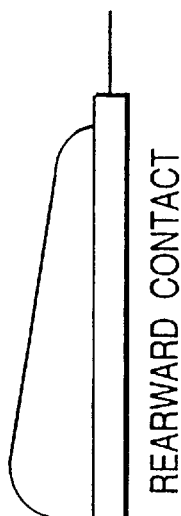
FIG. 18A
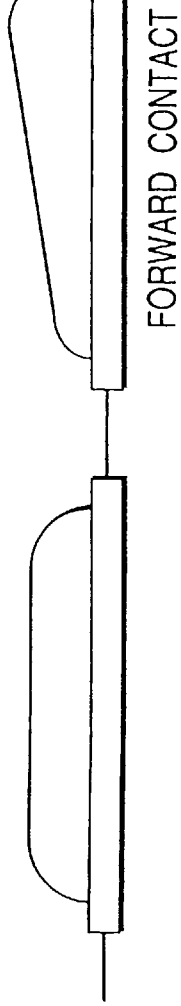
FIG. 18B
FORWARD CONTACT
← FRONT SIDE
FIG. 18C
REARWARD CONTACT
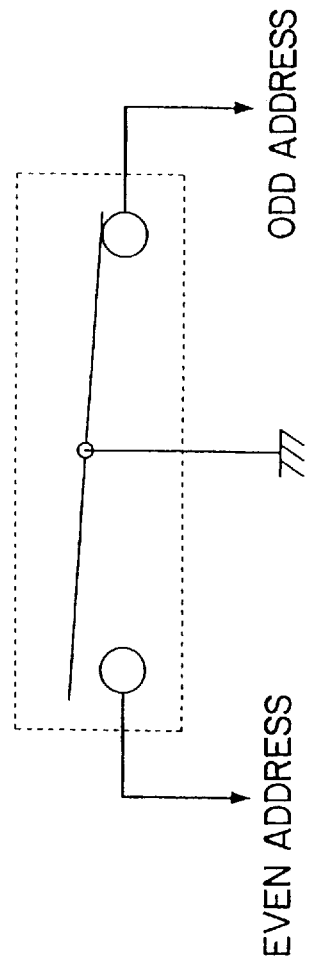
FIG. 18D
ODD ADDRESS
EVEN ADDRESS

FIG. 19

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| 00H | DATA STRUCTURE | | | | | | | | |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | DEFAULT CONTROL | | A - RLY1 |
| | CORRESPONDING SWITCH DATA ADDRESS | | | | | | | | |
| | DATA STRUCTURE | | | | | | | | |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | DEFAULT CONTROL | | A - RLY |

| DATA STRUCTURE | | | | | | | | |
|---|---|---|---|---|---|---|---|---|
| BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | DEFAULT CONTROL | | B - RLY1 |
| CORRESPONDING SWITCH VOLUME DATA ADDRESS | | | | | | | | |
| DATA STRUCTURE | | | | | | | | |
| BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | DEFAULT CONTROL | | B - RLY2 |
| CORRESPONDING SWITCH VOLUME DATA ADDRESS | | | | | | | | |

FIG. 20

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| | DATA STRUCTURE | | | | | | | | |
| | | | | CORRESPONDING SWITCH DATA ADDRESS | | | | | CORRESPONDING DOOR |
| | BLINK FORWARD CONTACT POINT | INTERLOCK FORWARD CONTACT POINT | INTERLOCK ASSOCIATED DOOR FORWARD CONTACT POINT | BLINK REARWARD CONTACT POINT | INTERLOCK REARWARD CONTACT POINT | INTERLOCK ASSOCIATED DOOR REARWARD CONTACT POINT | DOOR TYPE | | |

FIG. 21

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| | 0 | | CORRESPONDING SWITCH DATA ADDRESS | | | | | | FORWARDLY REVERSELY CIRCUIT 1 |
| | 0 | | CORRESPONDING SWITCH DATA ADDRESS | | | | | | |
| | 0 | 0 | 0 | 0 | 0 | KIND OF LOAD | | | |
| | 0 | | CORRESPONDING SWITCH DATA ADDRESS | | | | | | FORWARDLY REVERSELY CIRCUIT |
| | 0 | | CORRESPONDING SWITCH DATA ADDRESS | | | | | | |
| | 0 | 0 | 0 | 0 | 0 | KIND OF LOAD | | | |

FIG. 22

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| | 0 | CORRESPONDING VOLUME DATA ADDRESS ||||||| INCANDESCENT LAMP LIGHT MODULATION 1 |
| | 0 | CORRESPONDING VOLUME DATA ADDRESS ||||||| INCANDESCENT LAMP LIGHT MODULATION 1·2 |
| | 0 | 0 | ASSOCIATE DOOR OPENING | ASSOCIATE DOOR OPENING | 0 | 0 | ASSOCIATE DOOR OPENING | INCANDESCENT LAMP LIGHT MODULATION 1·2 |
| | 0 | 0 | ASSOCIATE DOOR OPENING | ASSOCIATE DOOR OPENING | LAMP COMPANY | LAMP COMPANY | ASSOCIATE DOOR OPENING | INCANDESCENT LAMP LIGHT MODULATION 3·4 |
| | LAMP COMPANY | LAMP COMPANY | ASSOCIATE DOOR OPENING | ASSOCIATE DOOR OPENING | LAMP COMPANY | LAMP COMPANY | ASSOCIATE DOOR OPENING | INCANDESCENT LAMP LIGHT MODULATION 5·6 |

FIG. 23

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| | 0 | | CORRESPONDING VOLUME DATA ADDRESS | | | | | | FLUORESCENT LAMP OUTPUT CONTROL 1 |
| | 0 | | CORRESPONDING VOLUME DATA ADDRESS | | | | | | FLUORESCENT LAMP OUTPUT CONTROL |
| | 0 | 0 | ASSOCIATE DOOR OPENING | | 0 | 0 | ASSOCIATE DOOR OPENING | | FLUORESCENT LAMP CONTROL 1·2 |
| | 0 | 0 | ASSOCIATE DOOR OPENING | | 0 | 0 | ASSOCIATE DOOR OPENING | | FLUORESCENT LAMP CONTROL 3·4 |

FIG. 24

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| | 0 | | | CORRESPONDING VOLUME DATA ADDRESS | | | | | |
| | 0 | 0 | 0 | 0 | 0 | 0 | ASSOCIATE DOOR OPENING | | 2F WIPER |

FIG. 25

| ADDRESS | BIT 7 | BIT 6 | BIT 5 | BIT 4 | BIT 3 | BIT 2 | BIT 1 | BIT 0 | DATA OUTPUT |
|---|---|---|---|---|---|---|---|---|---|
| | | SECOND DIGIT (0~9) | | | | FIRST DIGIT (0~9) | | | |
| | | FOURTH DIGIT (0~9) | | | | THIRD DIGIT (0~9) | | | |

FIG. 31

FRAME 1~16

|  | B7 | B6 | B5 | B4 | B3 | B2 | B1 | B0 |
|---|---|---|---|---|---|---|---|---|
| HEADER | 0 | 0 | 0 | 0 | 0 | 0 | 0 | 0 |
| DATA 1 | CONTENTS OF $E^2$ PROM ADDRESS 00H ||||||||
| DATA 8 | CONTENTS OF E PROM ADDRESS 07H ||||||||
| BCC | CHECK SUM OF DATA ||||||||

ID DATA
ACKNOWLEDGEMENT
ACK SIGNAL

FIG. 32A

SW UNIT

|  | B7 | B6 | B5 | B4 | B3 | B2 | B1 | B0 |
|---|---|---|---|---|---|---|---|---|
| HEADER | 1 | 0 | 0 | 0 | 0 | 0 | 0 | 0 |
| BCC | 1 | 0 | 0 | 0 | 0 | 0 | 0 | 0 |

FIG. 32B

UNIT B

|  | B7 | B6 | B5 | B4 | B3 | B2 | B1 | B0 |
|---|---|---|---|---|---|---|---|---|
| HEADER | 1 | 0 | 1 | 0 | 0 | 0 | 0 | 0 |
| BCC | 1 | 0 | 1 | 0 | 0 | 0 | 0 | 0 |

ID DATA CONFIRMATION ACK SIGNAL

FIG. 33A

UNIT A

| | B7 | B6 | B5 | B4 | B3 | B2 | B1 | B0 |
|---|---|---|---|---|---|---|---|---|
| HEADER | 1 | 1 | 0 | 1 | 0 | 0 | 0 | 0 |
| DATA | RESULT OF THE CHECK OF ALL ID DATA (SENT) ||||||||
| BCC | CHECK SUM OF DATA ||||||||

FIG. 33B

SW UNIT

| | B7 | B6 | B5 | B4 | B3 | B2 | B1 | B0 |
|---|---|---|---|---|---|---|---|---|
| HEADER | 1 | 1 | 0 | 0 | 0 | 0 | 0 | 0 |
| DATA | RESULT OF THE CHECK OF ALL ID DATA (RECEIVED) ||||||||
| BCC | CHECK SUM OF DATA ||||||||

FIG. 33C

UNIT B

| | B7 | B6 | B5 | B4 | B3 | B2 | B1 | B0 |
|---|---|---|---|---|---|---|---|---|
| HEADER | 1 | 1 | 1 | 0 | 0 | 0 | 0 | 0 |
| DATA | RESULT OF THE CHECK OF ALL ID DATA (RECEIVED) ||||||||
| BCC | CHECK SUM OF DATA ||||||||

FIG. 34A

FRAME 1~5

| | B7 | B6 | B5 | B4 | B3 | B2 | B1 | B0 |
|---|---|---|---|---|---|---|---|---|
| HEADER | 0 | 0 | 1 | 0 | 0 | 0 | 0 | 0 |
| DATA 1 | RX-SW | RX-B | BATTERY RELAY | LIGHTING | | ACTION OF WIPER | | OPEN/CLOSED CONDITION OF DOOR |
| DATA 2 | A-IPS4 SHORT | OPEN | A-IPS3 SHORT | OPEN | A-IPS2 SHORT | OPEN | A-IPS1 SHORT | OPEN |
| BCC | CHECK SUM OF DATA | | | | | | | |

FIG. 34B

FRAME 6, 7

| | B7 | B6 | B5 | B4 | B3 | B2 | B1 | B0 |
|---|---|---|---|---|---|---|---|---|
| HEADER | 0 | 0 | 1 | 1 | 0 | 1 | 0 | 1 |
| DATA 1 | RX-SW | RX-B | BATTERY RELAY | LIGHTING | | ACTION OF WIPER | | OPEN/CLOSED CONDITION OF DOOR |
| DATA 2 | FUSE 8 OPEN | FUSE 7 OPEN | | | | | | FUSE 1 OPEN |
| BCC | CHECK SUM OF DATA | | | | | | | |

FIG. 35A

FRAME 1

| | B7 | B6 | B5 | B4 | B3 | B2 | B1 | B0 |
|---|---|---|---|---|---|---|---|---|
| HEADER | 0 | 0 | 0 | 0 | 0 | 0 | 0 | 0 |
| DATA 1 | SW 4 | | SW 3 | | SW 2 | | SW 1 | |
| DATA 2 | | | | | | | | |
| DATA 6 | SW 24 | | SW 23 | | SW 22 | | SW 21 | |
| BCC | CHECK SUM OF DATA | | | | | | | |

FIG. 35B

FRAME 2

| | B7 | B6 | B5 | B4 | B3 | B2 | B1 | B0 |
|---|---|---|---|---|---|---|---|---|
| HEADER | 0 | 0 | 0 | 0 | 0 | 0 | 0 | 1 |
| DATA 1 | SW 28 | | SW 27 | | SW 26 | | SW 25 | |
| DATA 6 | RX-A | RX-B | ON/OFF SYNCHRONISM | | | | | |
| BCC | CHECK SUM OF DATA | | | | | | | |

FIG. 35C

FRAME 3, 4

| | B7 | B6 | B5 | B4 | B3 | B2 | B1 | B0 |
|---|---|---|---|---|---|---|---|---|
| HEADER | 0 | 0 | 0 | 0 | 0 | 0 | 1 | 0 |
| DATA 1 | VR 1 | | | | | | | |
| DATA 6 | VR 6 | | | | | | | |
| BCC | CHECK SUM OF DATA | | | | | | | |

FIG. 36A

FRAME 1~8

| | B7 | B6 | B5 | B4 | B3 | B2 | B1 | B0 |
|---|---|---|---|---|---|---|---|---|
| HEADER | 0 | 0 | 0 | 1 | 0 | 0 | 0 | 0 |
| DATA 1 | RX-SW | RX-A | | | | | | |
| DATA 2 | B-IPS4 SHORT | B-IPS4 OPEN | B-IPS3 SHORT | B-IPS3 OPEN | B-IPS2 SHORT | B-IPS2 OPEN | B-IPS1 SHORT | B-IPS1 OPEN |
| BCC | CHECK SUM OF DATA | | | | | | | |

FIG. 36B

FRAME 9

| | B7 | B6 | B5 | B4 | B3 | B2 | B1 | B0 |
|---|---|---|---|---|---|---|---|---|
| HEADER | 0 | 0 | 1 | 0 | 1 | 0 | 0 | 0 |
| DATA 1 | RX-SW | RX-A | | | | | | |
| DATA 2 | | | INCANDESCENT LAMP LIGHT MODULATION CIRCUIT 6 SHORT | INCANDESCENT LAMP LIGHT MODULATION CIRCUIT 5 SHORT | | | | |
| BCC | CHECK SUM OF DATA | | | | | | | |

FIG. 36C

FRAME 10

| | B7 | B6 | B5 | B4 | B3 | B2 | B1 | B0 |
|---|---|---|---|---|---|---|---|---|
| HEADER | 0 | 0 | 1 | 0 | 1 | 0 | 0 | 0 |
| DATA 1 | RX-SW | RX-A | | | | | | |
| DATA 2 | | | | | FLUORESCENT LAMP LIGHT MODULATION CIRCUIT 4 SHORT | | | FLUORESCENT LAMP LIGHT MODULATION CIRCUIT 1 SHORT |
| BCC | CHECK SUM OF DATA | | | | | | | |

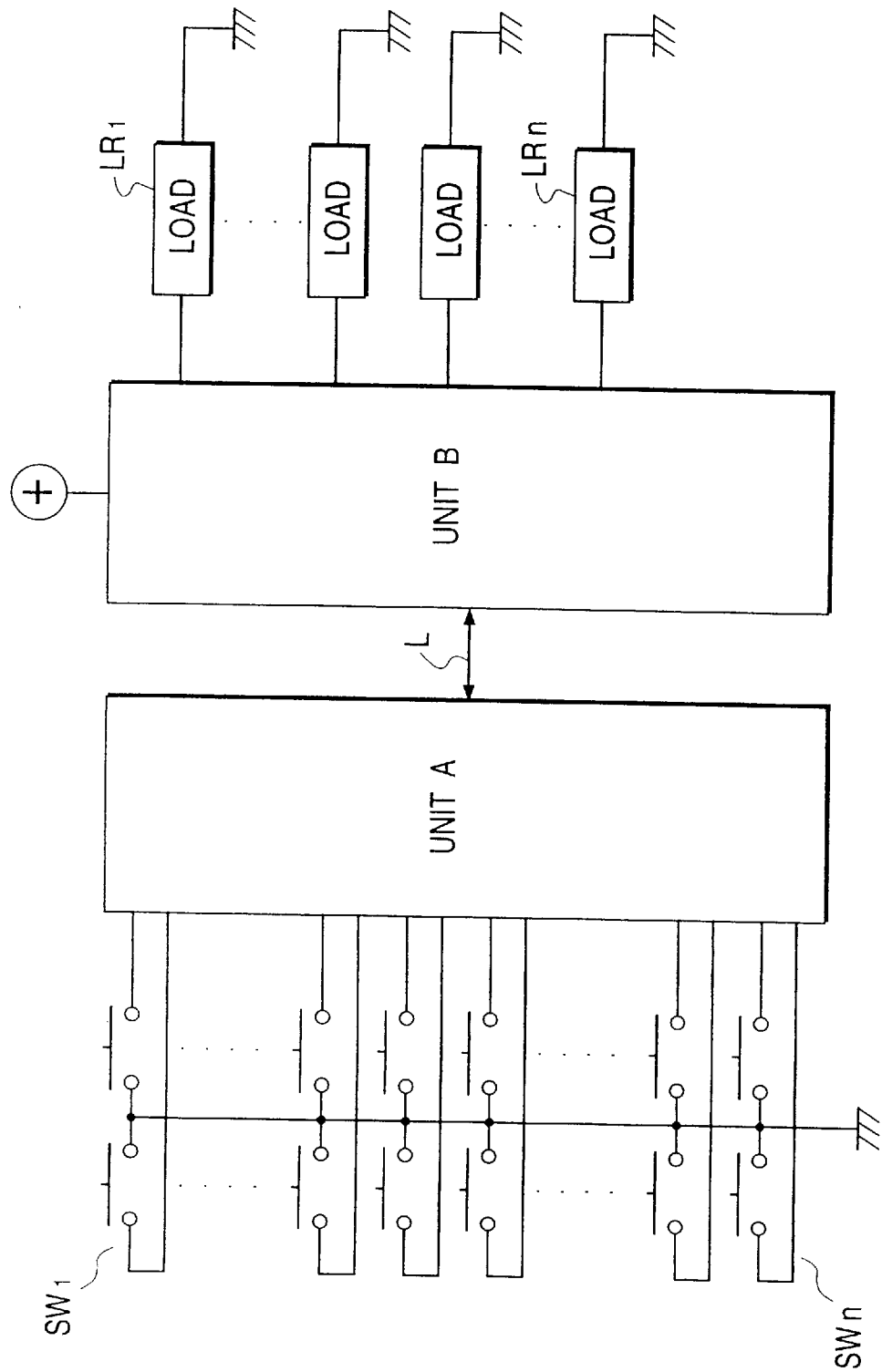

VEHICLE LOAD CONTROL SYSTEM

BACKGROUND OF THE INVENTION

1. Field of the Invention

The present invention relates to a vehicle load control system suitable for use in controlling electric power fed to lamps and motors aboard a vehicle.

2. Related Art

In a common vehicle, various loads such as lamps and motors are distributed throughout a vehicle body, and control switches for activating the loads are disposed around a driver's seat. The control switches and the loads which correspond to the control switches are connected together by signal lines. Recent vehicles are provided with a larger number of loads, and hence the number of signal lines is also increased. As a result, a wire harness (WH) which ties the signal lines and power lines in a bundle becomes larger in diameter and weight. This, in turn, makes it very laborious to lay the wire harness in the vehicle body, as well as resulting in the heavier vehicle body.

To prevent the above problem, a multiplex communications system is conventionally proposed, as shown in FIG. 37. In this system, the control switches disposed around the driver's seat are intensively connected to one unit A provided in the vicinity of the driver's seat. The loads distributed throughout the vehicle body are intensively connected to, for example, one unit B disposed in the vehicle body. These units A and B are connected to each other through a multiplex transmission line L.

In that multiplex communications system, control switches $SW_1$–$SW_n$ such as switches and volumes are connected to the unit A which acts as a control signal multiplex-processing section. On the other hand, loads $LR_1$–$LR_n$ which are arbitrarily activated by the control switches $SW_1$ to $SW_n$ are connected to the unit B which acts as a load control section. The units A and B are connected to each other through a multiplex transmission line L. Control signals generated as a result of the operation of the control switches $SW_1$–$SW_n$ are combined into a single signal by time-division multiplexing. The thus multiplexed signal is then sent to the unit B over the multiplex transmission line L, and the unit B then separates the multiplexed signal into the original control signals. By means of these control signals, the electric power fed to the corresponding loads $LR_1$–$LR_n$ is controlled. The means for connecting the units A and B to each other is standardized by the multiplex transmission line L. Hence, even if the control switches $SW_1$ to $SW_n$ and the loads $LR_1$ and $LR_n$ are changed, it is not necessary to change the connecting means. In consequence, the number of wire harness to be laid in order to connect the control switches with the load is considerably reduced.

Recently, associated with an increase in the number of on-vehicle systems and improvements in the performance of them, the number of, and the number of types of, control switches related to the on-vehicle systems are increasing. Further, the positions of the control switches which are many in number and have a lot of types also change as the number of types of vehicle specification increases. Even in such a circumstance, the use of the multiplex transmission line makes it possible to standardize inter-unit wire harness for each type of vehicle specification.

The loads are not simply turned on and off by the actuation of the control switches $SW_1$–$SW_n$. For example, there are several types of lamp; namely, a lamp which constantly illuminates in response to the actuation of the control switch, a lamp which blinks by the actuation of the control switch, and a lamp which does not immediately illuminate by turning on the control switch, such as a lamp used in a bus which illuminates constantly or blinks corresponding to the opening/closing action of the door. If the lamps are changed according to the vehicle specifications, it is necessary to change the unit A which acts as the control signal multiplex processing section and the unit B which acts as the load control section, for each change. The diversification of parts results in increased manufacturing cost as well as the troublesome management of the parts.

Further, the wire harness laid between the control switches $SW_1$ to $SW_n$ and the unit A in order to connect them together becomes complicated, or the number of types of wire harness increases. Further, the ease of connection of the wire harness to the switches is deteriorated, which in turn adds to the manufacturing cost.

SUMMARY OF THE INVENTION

The present invention has been conceived in view of the foregoing drawbacks in the art, and the primary object of the present invention is to provide an improved vehicle load control system capable of easily coping with modifications in the form of control of loads by control switches.

Another object of the present invention is to provide an improved vehicle load control system which makes it possible to standardize a wire harness without deteriorating the ease of assembly of the wire harness and a cost increase by preventing an increase in the number of types of wire harness for connection purposes as well as preventing the complication of the wire harness even if the number of, and the number of types of, control switches associated with a vehicle system increase.

A vehicle load control system according to the present invention conceived to achieve the above object including a control section which has a plurality of control switches and generates a control signal corresponding to the actuation of each of the control switches, a multiplex processing section which multiplexes the control signal received from the control section and sends the thus multiplexed control signal to a multiplex transmission line, and load control sections which receive the multiplexed control signal sent over the multiplex transmission line and control the electric power fed to a corresponding one of loads on the basis of the thus received control signal, wherein the load control sections further comprises: storage means which hold output control data so as to correspond to the control switches, the output control data representing the form of control of an output from the corresponding load which is controlled by actuation of the control switch; and control means which control the electric power fed to the corresponding load on the basis of the received control signal with reference to output control data stored in the storage means.

A vehicle load control system according to the present invention conceived to achieve the above object including a control section 11 which has a plurality of control switches arranged in a control panel and generates a control signal corresponding to the actuation of each of the control switches, a multiplex processing section 10 which multiplexes the control signal received from the control section and sends the thus multiplexed control signal to a multiplex transmission line, and load control sections which receive the multiplexed control signal sent over the multiplex transmission line and control the electric power fed to a corresponding one of loads on the basis of the thus received control signal, wherein each of the control switches incorporates one switching circuit selected from a plurality of types of switching circuit which share a plurality of signal terminals; the plurality of control switches and the multiplex processing section are connected together by a plurality of wire harness having the same structure; and the load control sections comprise: storage means which hold configuration data representing the configuration of the switching circuit of the control switch, so as to correspond to each of the loads; and control means which control the electric power fed to the corresponding load on the basis of the received control signal with reference to the configuration data stored in the storage means.

In the vehicle load control system having the above described configuration, the multiplex processing section multiplexes the control signal received from the control section which has the plurality of control switches and generates the control signal corresponding to the actuation of each of the control switches. The thus multiplexed control signal is sent to the multiplex transmission line. The load control sections receive the multiplexed control signal sent over the multiplex transmission line. The load control sections then control the electric power fed to a corresponding one of the loads on the basis of the received control signal. The output control data, representing the form of the control of an output from the corresponding load which is controlled as a result of actuation of the control switch, are stored in the storage means of the load control section according to the control switches. The control means control the electric power fed to a corresponding load on the basis of the received control signal with reference to the output control data stored in the storage means. Therefore, even if the form of the control of the loads is changed according to vehicle specifications, it is possible for the vehicle load control system to cope with those changes only by changing the output control data stored in the storage means.

The storage means which hold the output control data are preferably made up of built-in nonvolatile memory of a storage medium which is removably attached to the load control section. When the form of the load control is determined according to the vehicle specifications, the output control data are written into the nonvolatile memory, and the storage medium is attached and connected to the load control section.

The storage means in which the output control data are stored previously hold data for specifying correspondences between the control switches and the loads controlled by the control switches. In consequence, even if the loads are changed according to the vehicle specifications, it becomes possible for the vehicle load control system to cope with those changes by changing the specifying data.

The load control sections are provided with signal input means $20f$ and $30f$ for permitting the entry of an operating signal which represents an operating condition of a specific load. The storage means hold data for specifying an interlocked operation associated with the specific load. The control means control the electric power fed to a corresponding load on the basis of the received control signal and the control signal input from the signal input means. Hence, it becomes possible for the vehicle load control system to cope with changes in the interlocked operation between the loads caused by the vehicle specifications.

In the above described configuration, each of the plurality of control switches comprises one switching circuit selected from a plurality of types of switching circuit which share a plurality of signal terminals. Those control switches and the multiplex processing section are connected to each other by means of the plurality of wire harness SH having the identical structure. The storage means of the load control sections hold configuration data representing the configuration of the switching circuit of the control switch, so as to correspond to each of the loads. Hence, the control means of the load control sections can control the electric power fed to the corresponding load on the basis of the received control signal with reference to the configuration data stored in the storage means.

The type of switching circuit comprises a hold type on-off switch, a hold type on 1-off-on 2 switch, and a momentary type on 1-off-on 2 switch.

Even if the control switches $11_1$ to $11_n$ are selected from the hold type on-off switch, the hold type on 1-off-on 2 switch, and the momentary type on 1-off-on 2 switch, the plurality of wire harness SH having the same structure may be used to connect together the control switches $11_1$ to $11_n$ and the multiplex processing section.

The wire harness SH which is as many as the plurality of control switches connected to the wire harness by way of connectors are tied in one connector, and the thus bundled wire harness SH is connected to the multiplex processing section.

In consequence, the number of wire harness and the number of connectors used in the multiplexing section are reduced, which in turn makes it possible to improve operability and to realize a compact multiplex processing section.

The multiplex processing section has parallel-to-serial converting means. The parallel-to-serial converting means simultaneously receives the on/off conditions of signal terminals of the switching circuits of the control switches as control signals, and converts the control signals into a serial signal.

With this arrangement, the parallel-to-serial converting means of the multiplex processing section simultaneously receives the on/off conditions of the signal terminals of the switching circuits of the control switches as control signals, and converts the control signals into a serial signal. As a result, the number of inputs into the control means is reduced.

The multiplex processing section has control data generating means for generating a transmission frame which is composed of a plurality of control data items and previously defines the correspondence between bits and the signal terminals of the switching circuit of each control switch, on the basis of the control signal received from the control section.

The control data generating means of the multiplex processing section generates a transmission frame which is composed of a plurality of control data items and previously defines the correspondence between bits and the signal terminals of the switching circuit of each control switch, on the basis of the control signal received from the control section. Consequently, the length of transmission data becomes shorter.

BRIEF DESCRIPTION OF THE DRAWINGS

FIGS. 7A and 7B are tables for illustrating the layout of connector terminals of the SW unit shown in FIG. 5;

FIG. 17 is a diagrammatic representation showing one example of control data stored in nonvolatile memory in the recording medium;

FIGS. 18A to 18D are diagrammatic representations for illustrating the relationship between the operating conditions of the control switch and a switch terminal;

FIG. 19 is a diagrammatic representation showing another example of the control data stored in the nonvolatile memory in the recording medium;

FIG. 20 is a diagrammatic representation showing still another example of the control data stored in the nonvolatile memory in the recording medium;

FIG. 21 is a diagrammatic representation showing yet another example of the control data stored in the nonvolatile memory in the recording medium;

FIG. 22 is a diagrammatic representation showing a further example of the control data stored in the nonvolatile memory in the recording medium;

FIG. 23 is a diagrammatic representation showing a furthermore example of the control data stored in the non-volatile memory in the recording medium;

FIG. 24 is a diagrammatic representation showing furthermore example of the control data stored in the nonvolatile memory in the recording medium;

FIG. 25 is a diagrammatic representation showing an example of a user code stored in the nonvolatile memory in the recording medium;

FIG. 31 is a schematic representation showing the communications data used in the ID data communications mode;

FIGS. 32A and 32B are schematic representations showing an ID data acknowledgement ACK signal sent from the SW unit and the load drive unit B;

FIGS. 33A–33C are schematic representations showing an ID data confirmation ACK signal sent by the SW unit and the load drive units A and B;

FIGS. 34A and 34B are schematic representations showing the data sent by the load drive unit A in the normal communications mode;

FIGS. 35A to 35C are schematic representations showing the data sent by the SW unit in the normal communications mode;

FIGS. 36A to 36C are schematic representations showing the data sent by the load drive unit B in the normal communications mode; and FIG. 37 is a schematic diagram showing one example of a conventional vehicle load control system.

DETAILED DESCRIPTION OF THE PREFERRED EMBODIMENTS

Figure 1:
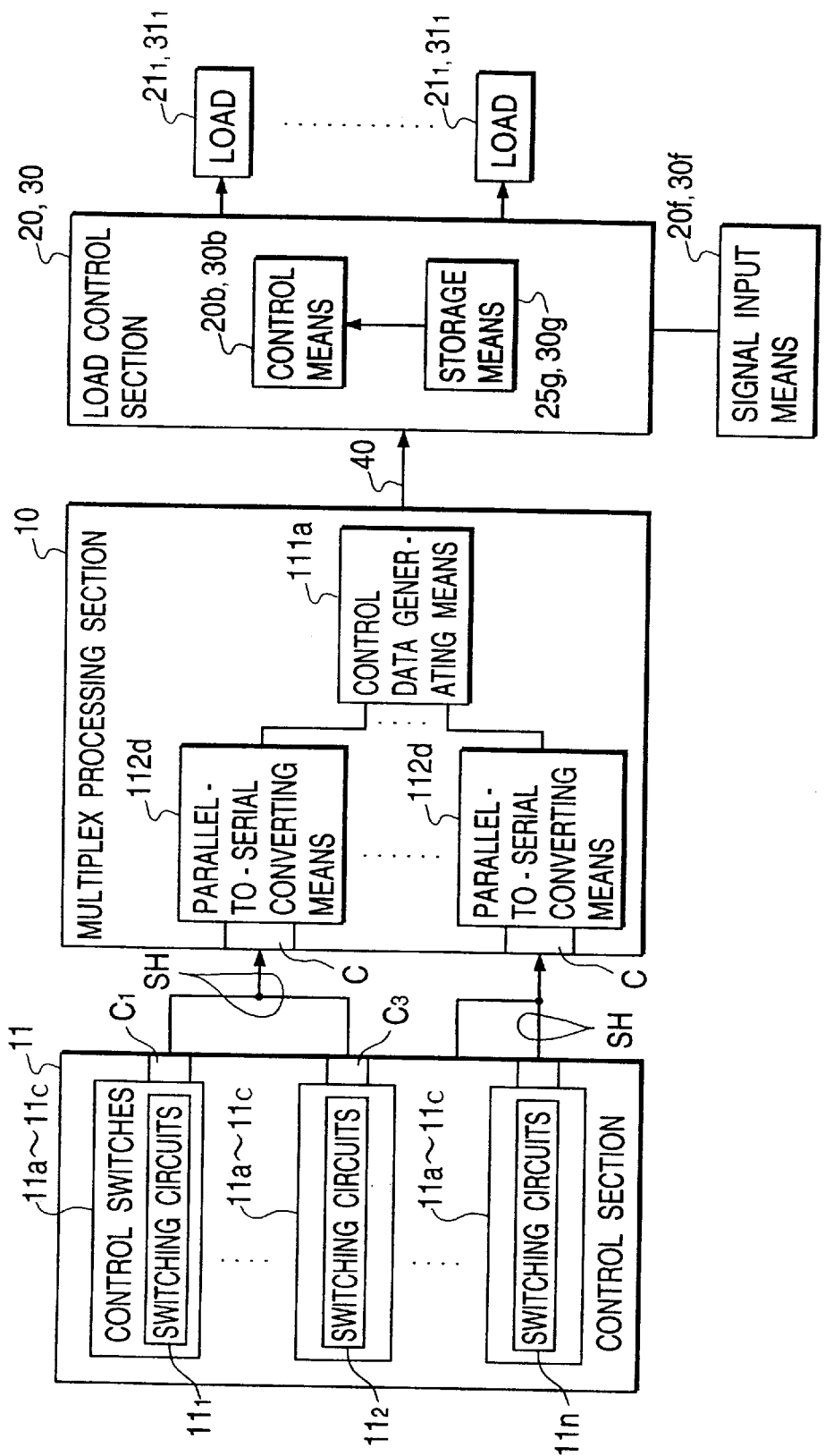
FIG. 1 is a block diagram showing the basic configuration of a vehicle load control system according to the present invention.
Figure 2:
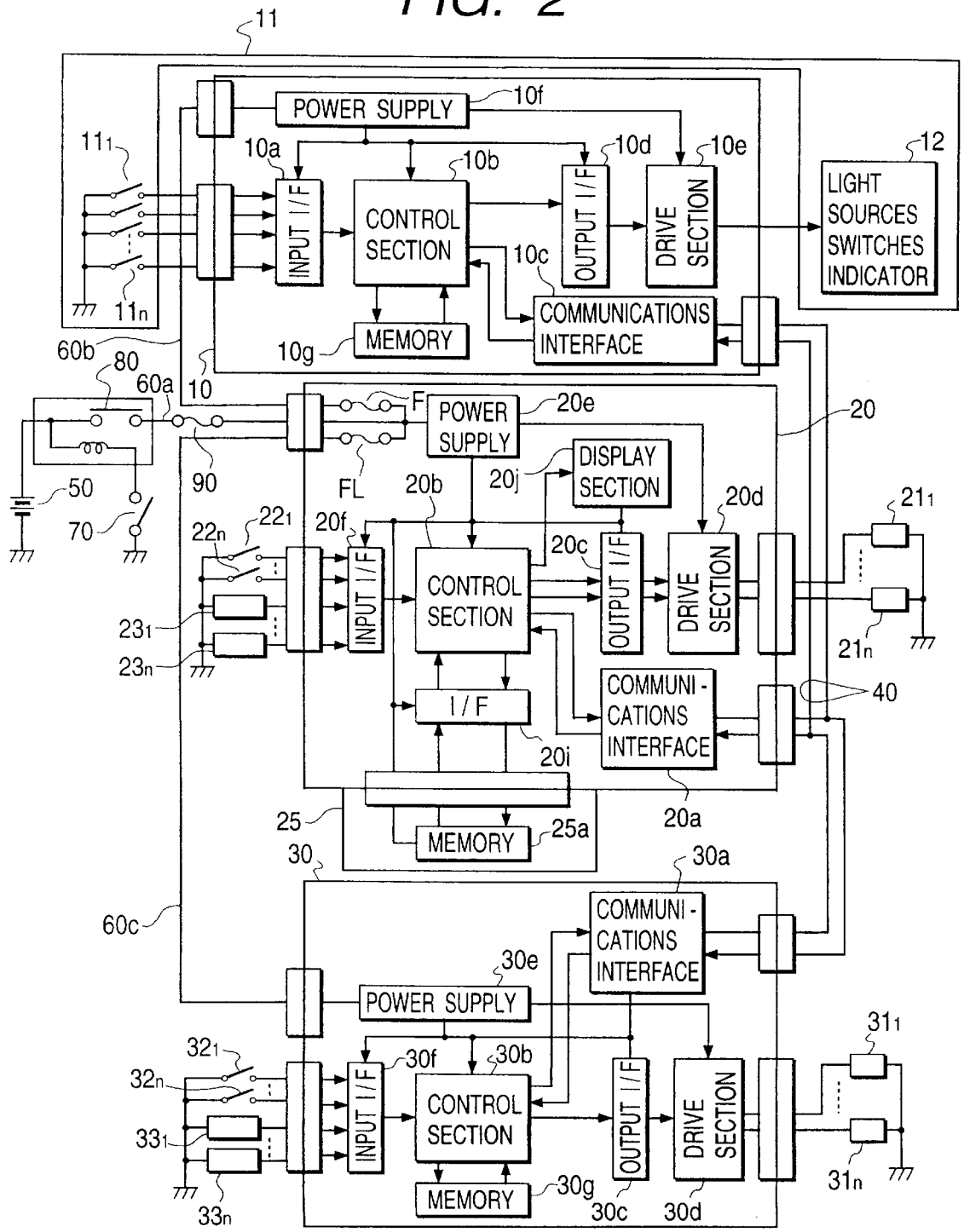
FIG. 2 is a circuit diagram showing one embodiment of a vehicle load control system suitable for use as a multiplex communications system.

With reference to the accompanying drawings, an illustrative embodiment of the present invention will be described hereinbelow. FIG. 2 is a circuit diagram showing one embodiment of a vehicle load control system suitable for use as a multiplex communications system used in a motorbus. In the drawing, the motorbus multiplex communications system comprises a switch unit (SW) 10 which acts as a multiplex processing section, a load drive unit A 20 which acts as a load control section, a load drive unit B 30 which also acts as a load control section, a multiplex transmission line 40 which interconnects the three units with each other and establishes communications among the units, a battery 50 for feeding electric power to each of the units 10, 20, and 30, and power lines 60a–60c respectively laid between the battery 50 and the load drive unit A20, between the load drive unit A20 and the SW unit 10, and between the load drive unit A 20 and the load drive unit B 30. A battery relay 80 which is turned on and off by a battery relay switch 70 and a fusible link (FL) 90 are provided, in that order from the battery 50, in the power line 60a between the battery 50 and the load drive unit A 20.

The SW unit 10 is connected to a control section 11. The control section 11 comprises a plurality of switches 11$_1$–11$_n$ arranged in a control panel (not shown), and light sources 12 for illumination purposes which are incorporated in the respective control switches for illuminating the surface of the control switch, and a light source 12 for use with an indicator which indicates operating conditions. The control section 11 generates a control signal corresponding to the actuation of each control switch. The SW unit 10 comprises a control section 10b which receives the control signal from the control section 11, being made up of the control switches 11$_1$–11$_n$ and connected to the SW unit 10, through an input interface (I/F) 10a, and nonvolatile memory 10g which is connected to the control section 10b and is made up of E$^2$PROM holding various data as will be described later.

The control section 10b converts the received control signal into control data and generates a transmission frame by collecting a plurality of thus converted control data items. The control section 10b sends the transmission frame to the load drive units A 20 and B 30 through the communication interface (I/F) 10c and the multiplex transmission line 40. Further, the control section 10b outputs a drive signal to a drive section 10e consisting of switching means (not shown) through an output interface (I/F) 10d. Upon receipt of the drive signal, the drive section 10e is activated so as to control the illumination of the light sources 12 respectively provided in the control switches by selectively feeding the light sources the electric power from a power supply 10f. The power supply 10f is supplied with the electric power fed from the battery 50 through the power line 60b. The power supply 10f also feeds operating power to the input I/F 10a, the control section 10b, and the output I/F 10d.

The load drive unit A 20 is connected to a first electrical equipment group mounted on the body of the motorbus, that is, loads 21$_1$–21$_n$. Further, the load drive unit A 20 is provided with a control section 20b which is connected to the SW unit 10 via the multiplex transmission line 40. The control section 20b receives the control data from the SW unit 10 by way of a communications interface (I/F) 20a. The control section 20b sends a drive signal based on the received control data to a drive section 20d, consisting of unillustrated switching means, by way of an output interface (I/F) 20c. The drive section 20d is activated by the received drive signal so as to drive an associated load by selectively feeding the electric power received from a power supply 20e to the load. The power supply 20e is supplied with the electric power fed from the battery 50 through the power line 60a. The power line 60a led into the load drive unit A 20 is divided into power lines 60b and 60c. The load drive unit A 20 is provided with a fuse F and a fusible link FL which respectively connect the power line 60a with the power lines 60b and 60c.

The load drive unit A 20 is also connected to a first group of detecting switches 22$_1$–22$_n$ and sensors 23$_1$–23$_n$ mounted on the body of the motorbus. Signals output from these switches and sensors are input to the control section 20b by way of an input interface (I/F) 20f. Battery relays, lighting switches, and switches for detecting the operation of wipers, microinversions, and the opening of a door can be mentioned as the detecting switches 22$_1$–22$_n$. The control section 20b uses the previously described input signals when controlling the loads 21$_1$–21$_n$. Further, the control section 20b converts the input signals into data and sends the thus converted data to the other units, i.e., the SW unit 10 and the load drive unit B 30, by way of the communications interface I/F 20a and the multiplex transmission line 40.

A storage medium 25 is removably attached to the load drive unit A 20. The storage medium 25 incorporates nonvolatile memory 25a which is made up of E$^2$PROM and holds various data as will be described later in detail. The data stored in the nonvolatile memory 25a are read by the control section 20b by way of the interface (I/F) 20i, and the thus read data are used in controlling the loads 21$_1$–21$_n$ of the control section 20b. Data collected by the control section 20b and data received from the other units are also written into the nonvolatile memory 25a of the storage medium 25. The control section 20b reads at least some of the data written into the nonvolatile memory 25a of the storage medium 25, and the thus read data are displayed on a display section 20j.

The load drive unit B 30 is connected to a second electrical equipment group mounted on the body of the motorbus, i.e., loads 31$_1$–31$_n$. The load drive unit B 30 is provided with a control section 30b which is connected to the SW unit 10 via the multiplex transmission line 40. The control section 30b receives the control data from the SW unit 10 by way of a communications interface (I/F) 30a. The load drive unit B 30 is further provided with nonvolatile memory 30g which is made up of E$^2$PROM connected to the control section 30b. The nonvolatile memory 30g holds various data which will be described later. The control section 30b sends a drive signal based on the received control data to a drive section 30d, consisting of unillustrated switching means, by way of an output interface (I/F) 30c. The drive section 30d is activated by the received drive signal so as to drive an associated one of the loads 31$_1$–31$_n$ by selectively feeding the electric power received from a power supply 30e to the load. The power supply 30e is supplied with the electric power fed from the battery 50 through the power lines 60c and 60a.

The load drive unit B 30 is connected to a second group of detecting switches 32$_1$–32$_n$ and sensors 33$_1$–33$_n$ mounted on the body of the motorbus. Signals output from these switches and sensors are input to the control section 30b by way of an input interface (I/F) 30f. The control section 30b uses the above described input signals when controlling the loads 31$_1$–31$_n$ on the basis of the data received from the SW unit 10. Further, the control section 30b converts the input signals into data and sends the thus converted data to the other units, i.e., the SW unit 10 and the load drive unit A 20, by way of the communications interface I/F 30a and the multiplex transmission line 40.

The control section 20b reads data from the nonvolatile memory 25b built into the storage medium 25 which is removably connected to the load drive unit A 20. The thus read data are written into the nonvolatile memory 10g of the SW unit 10 and the nonvolatile memory 30b of the load drive unit B 30 after having been sent over the multiplex transmission line 40.

Figure 3:
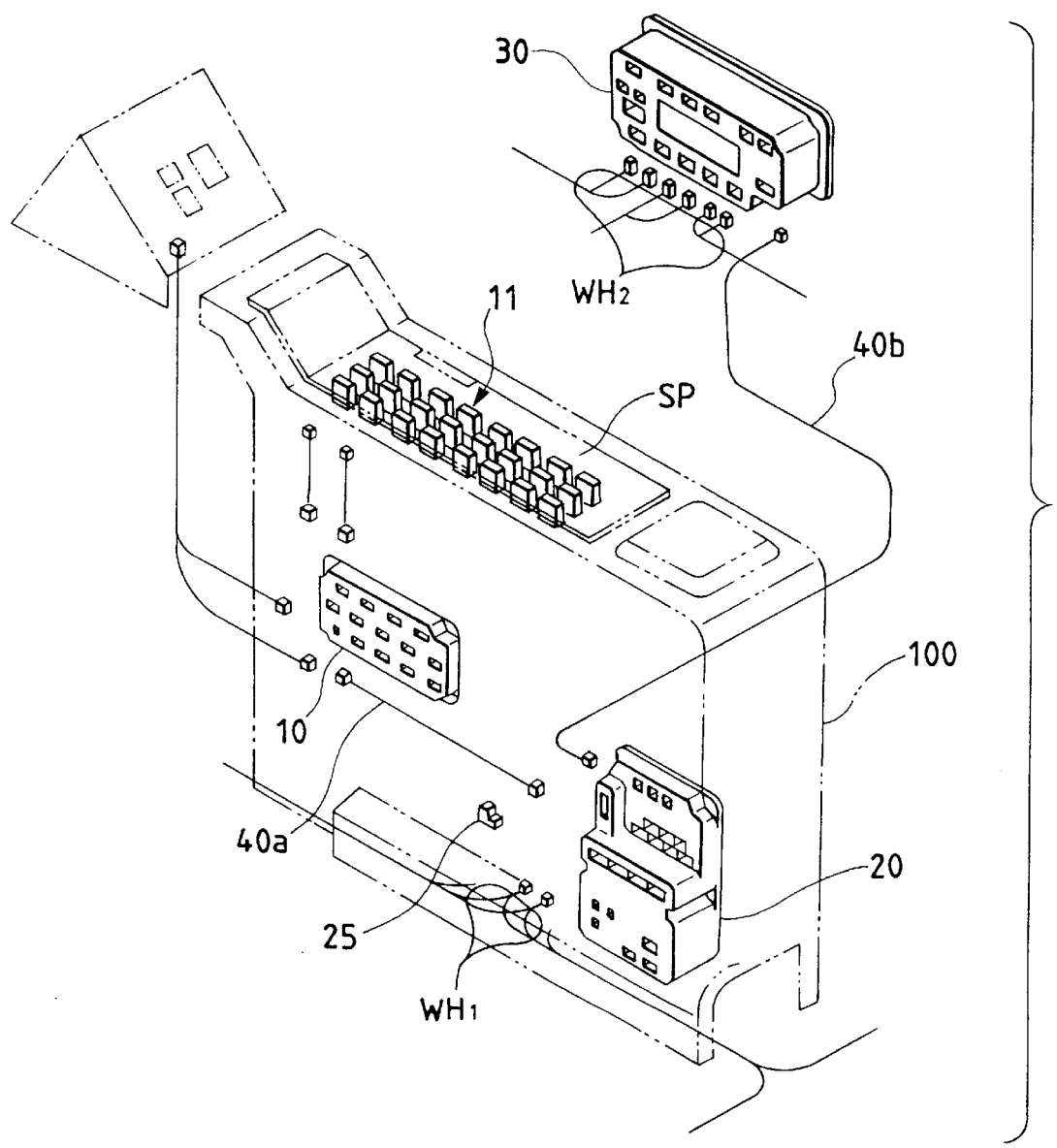
FIG. 3 is a schematic representation showing the positional relationship between units of the vehicle multiplex communication system shown in FIG. 2.

FIG. 3 shows the layout of the above described vehicle load control system. In this system, the control section 11 consists of various control switches arranged in a switch panel SP placed on the top of a switch box 100 beside a bus driver's seat. The control signals output from the control section 11 are intensively input to the SW unit 10. The thus input control signals are sent to the load drive unit A 20 disposed in the switch box 100 and the load drive unit B 30 situated at an arbitrary position through the wire harness 40a and 40*b*. As a result, the corresponding loads are controlled. The SW unit 10 is mounted inside the switch box 100 installed on the right side of the drivers's seat. The control signals output as a result of the actuation of the control switches are input to the SW unit 10, and the SW unit 10 converts the signals into data and sends the thus converted data to the load drive unit A 20 and the load drive unit B 30 through the multiplex transmission lines consisting of the wire harness 40A and 40B.

As with the SW unit 10, the load drive unit A 20 is mounted in the switch box 100 on the right side of the driver's seat. The load drive unit A 20 controls the loads 21$_1$–21$_n$ (FIG. 2) using the control data received from the SW unit 10. The loads 21$_1$–21$_n$ are mounted at an arbitrary position and are connected to the load drive unit A 20 through common wire harness WH$_1$. The load drive unit B 30 controls the loads 31$_1$–31$_n$ (FIG. 2) using the control data received from the SW unit 10 by way of the load drive unit A 20. The loads 31$_1$–31$_n$ are mounted at an arbitrary position and are connected to the load drive unit B 30 through common wire harness WH$_2$. The load drive units A 20 and B 30 have the function of modulating light of incandescent lamps and fluorescent lamps. They controls the modulation of light according to the operation of a control knob of the control switch arranged in the switch panel SP.

Figure 4:
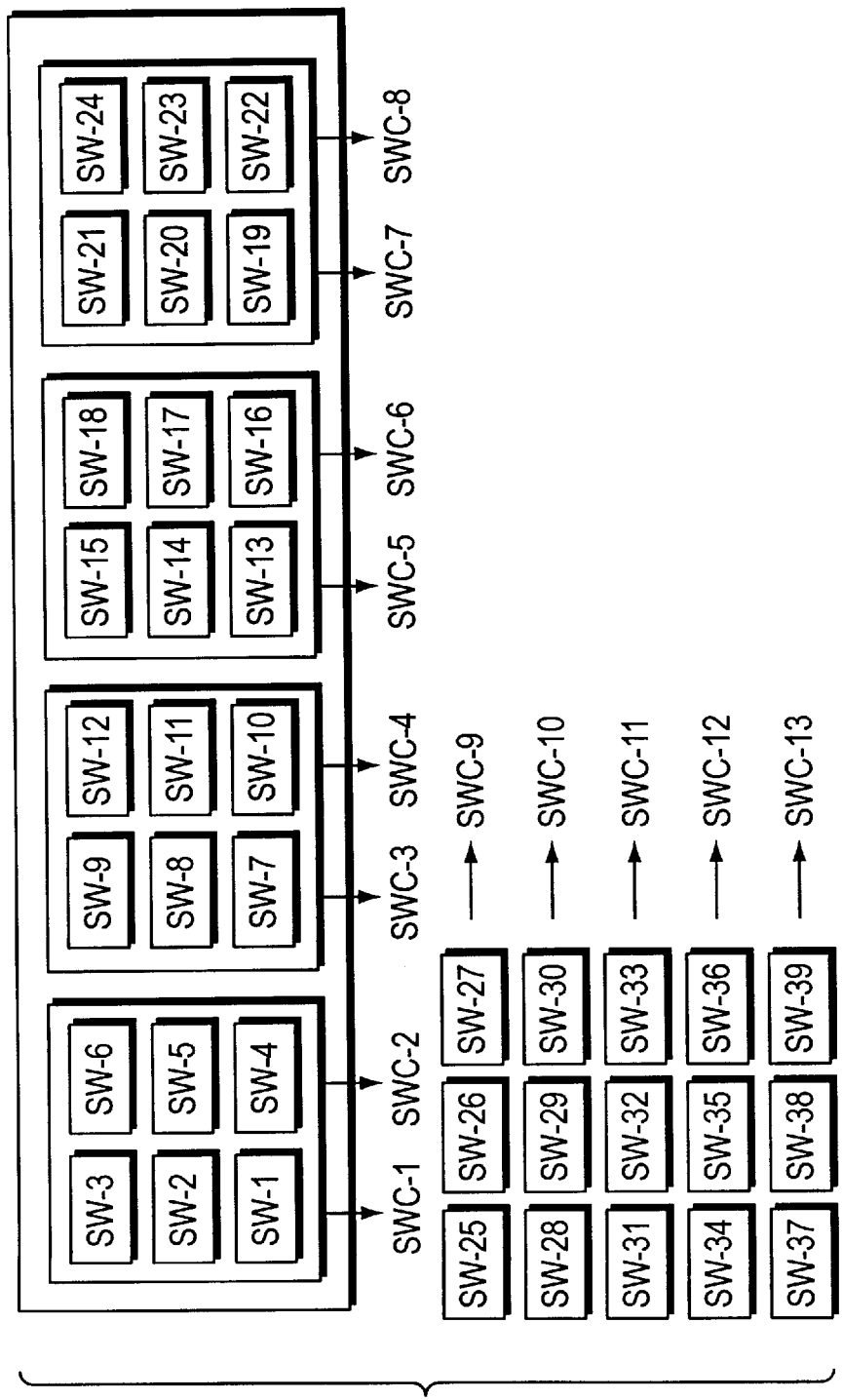
FIG. 4 is a diagrammatic representation showing the layout of control switches on a switch panel shown in FIG. 3.
Figure 5:
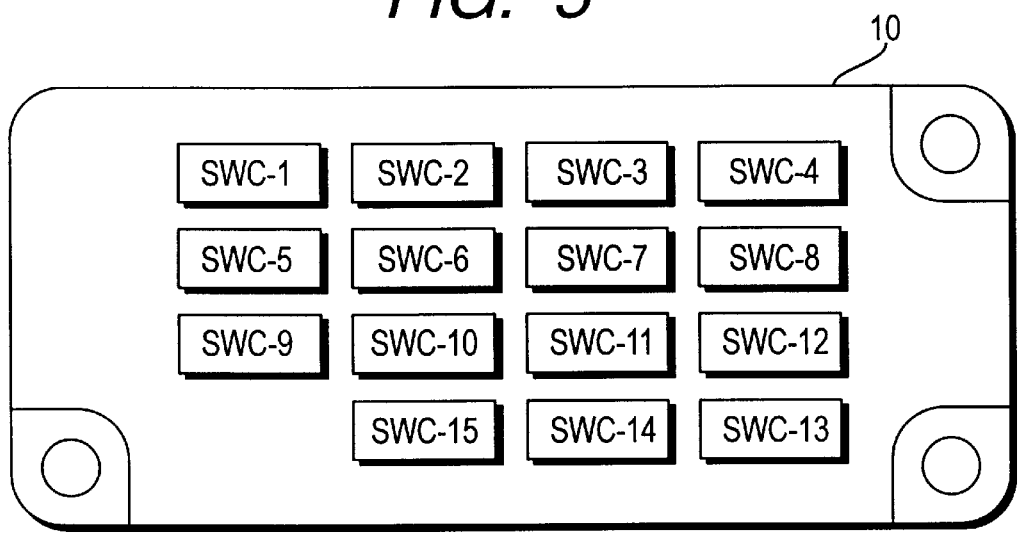
FIG. 5 is a diagrammatic representation showing the layout of connectors of a SW unit shown in FIG. 3.
Figure 6:
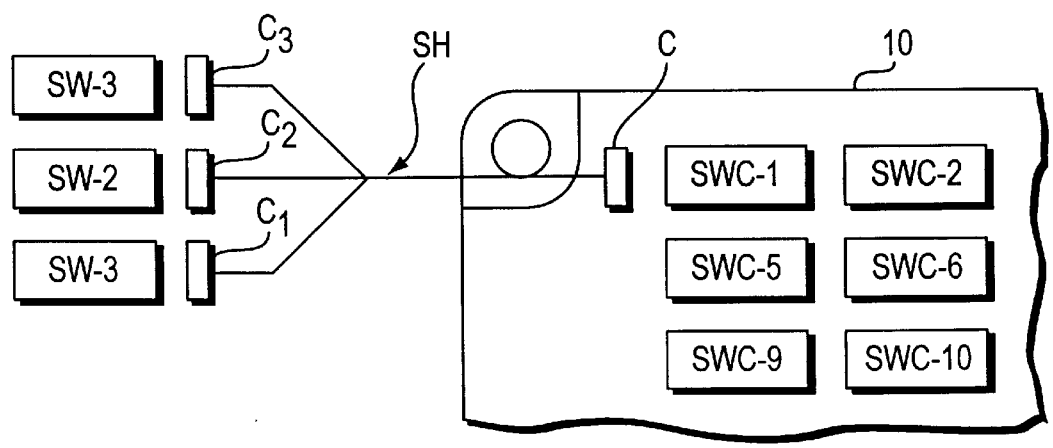
FIG. 6 is a diagrammatic representation showing a wire harness which connects a plurality of control switches to the SW unit.

For example, switches SW-1 to SW-24 are arranged in the switch panel SP, as shown in FIG. 4. Further, various switches SW-25 to SW-39 are arranged around a cluster of meters. The switches SW-1 to SW-39 are arranged in groups of three switches; for example, the switches SW-1 to SW-3, SW-4 to SW-6, . . . The thus grouped switches are respectively connected to switch connectors SW1 to SW13 arrayed in the SW unit 10, as shown in FIG. 5. To this end, a sub harness SH is formed by connecting ends of electrical wires which have the other ends respectively connected to the switches SW-1 to SW-3 via connectors C$_1$–C$_3$ to one connector C, as shown in FIG. 6. The connector C of this sub-harness SH is connected to a corresponding switch connector SWC-1 of the SW unit 10. A switch connector SWC-14 of the SW unit 10 is used for connecting the SW unit 10 to the load drive unit A 20, and a switch connector SWC 15 is used for connecting the SW unit 10 to an external monitor.

Each of the switch connectors SWC-1 to SWC-4 of the SW unit 10 is used for inputting both switch data and control knob data. FIG. 7A shows the arrangement of terminals of the switch connector SWC-1. For example, the switch connector SW 1 has terminals for a signal 2/VR1 (a signal), a signal 1, an indicator 2, an indicator 1, and a VR1 (GND) and a VR1 (for illumination purposes) connected to the sub harness SH which is further connected to the switches SW-1 to SW-3. Switch connectors SWC-5 to SWC-13 are specifically designed to input switch data. FIG. 7B shows the arrangement of terminals of the switch connector SW5. In short, the switch connector SW5 has terminals for the signal 2, the signal 1, the indicator 2, the indicator 1, and a terminal for GND and illumination purposes.

The switches SW-1 to SW-39 are selected from switches or switches having control knobs, as shown in FIGS. 8 to 11. FIG. 12 shows the arrangement of the switches.

Figure 8A:
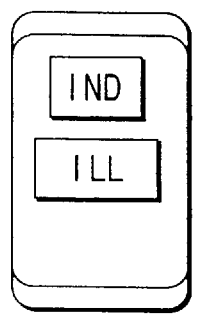
FIGS. 8A and 8B are schematic representations showing one example of the control switch.
Figure 8B:
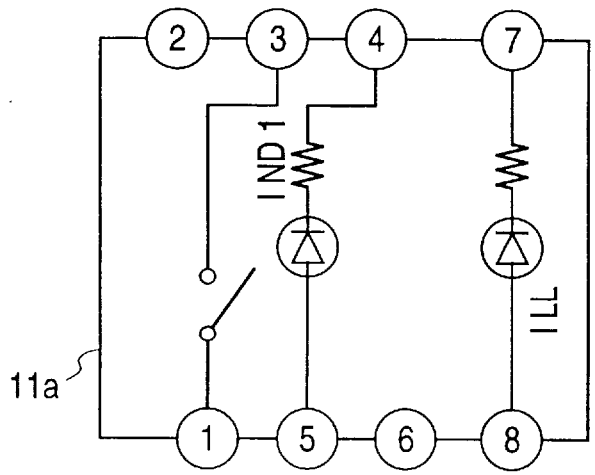

FIGS. 8A and 8B show a hold type on-off switch used as an emergency room light switch or a light for reading purposes. A switching circuit 11*a* is formed between terminals, as shown in FIG. 8B. A terminal 2 is connected to a fixed contact point, and a terminal 1 is connected to a movable contact point, whereby the on-off switch is formed. An LED for illumination purposes (ILL) is connected between terminals 8 and 7 together with a current limiting resistor, whereas an LED for use as an indicator (IND) is connected between terminals 5 and 4 together with a current limiting resistor. When the on-off switch is connected to the switch connector SWC-1 of the SW unit 10, the terminals 1 and 4 are connected to GND; the terminal 2 is connected to the signal 1; the terminal 8 is connected to the terminal for illumination; and the terminal 5 is connected to the indicator 1.

Figure 9A:
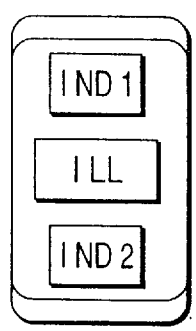
FIGS. 9A and 9B are schematic representations showing another example of the control switch.
Figure 9B:
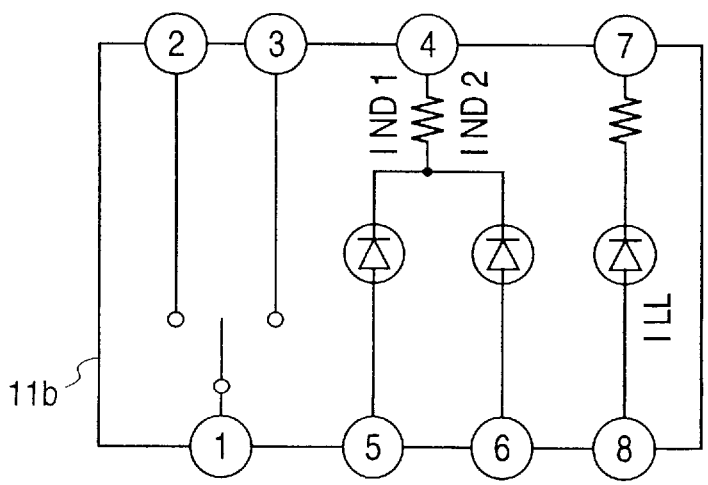

FIGS. 9A and 9B show a hold type on 1-off-on 2 switch used as a foot lamp switch or a ventilation fan switch. A switching circuit 11*b* is formed between the terminals, FIG. 9B. In short, terminals 2 and 3 are connected to first and second fixed contact points, respectively. A terminal 1 is connected to a movable contact point. As a result, the on 1-off-on 2 switch is formed. An LED for illumination purposes is connected between terminals 8 and 7 together with a current limiting resistor, whereas LEDs 1 and 2 for use as an indicator are connected between terminals 5, 6, and 4 together with a current limiting resistor. When the on 1-off-on 2 switch is connected to the switch connector SW1 of the SW unit 10, the terminals 1 and 4 are connected to GND; the terminals 1, 4, and 7 are connected to GND; the terminals 2 and 3 are connected to the signal terminals 1 and 2; and the terminal 8 is connected to the terminal for illumination; and terminals 5 and 6 are connected to the indicators 1 and 2.

Figure 10A:
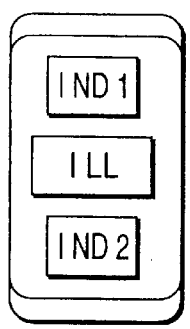
FIGS. 10A and 10B are schematic representations showing still another example of the control switch.
Figure 10B:
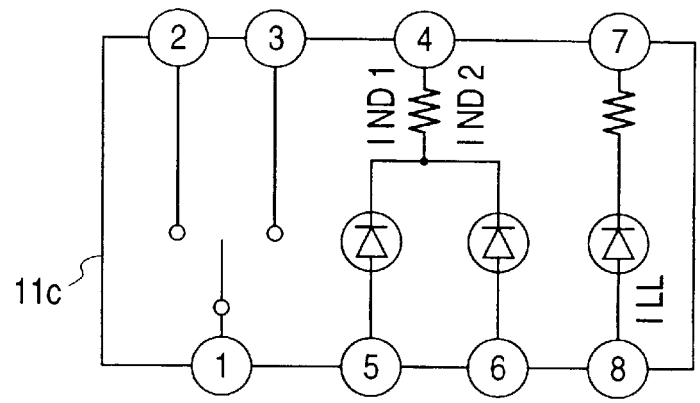

Figs. 10A and 10B show a momentary type on 1-off-on 2 switch used as a retractable mirror switch. A switching circuit 11*c* is formed between the terminals, as shown in FIG. 10B. In short, terminals 2 and 3 are connected to first and second fixed contact points, respectively. A terminal 1 is connected to a movable contact point. As a result, the momentary type on 1-off-on 2 switch is formed. An LED for illumination purposes is connected between terminals 8 and 7 together with a current limiting resistor, whereas LEDs 1 and 2 for use as an indicator are connected between terminals 5, 6, and 4 with a current limiting resistor being directly connected to the terminal 4. When this momentary on 1-off-on 2 switch is connected to the switch connector SWC-9 of the SW unit 10, the other terminals are connected in the same way as those of the previously described hold type on 1-off-on 2 switch.

Figure 11A:
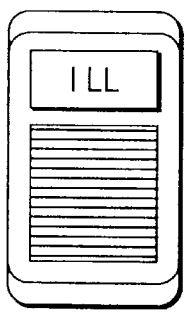
FIGS. 11A and 11B are schematic representations showing a further example of the control switch.
Figure 11B:
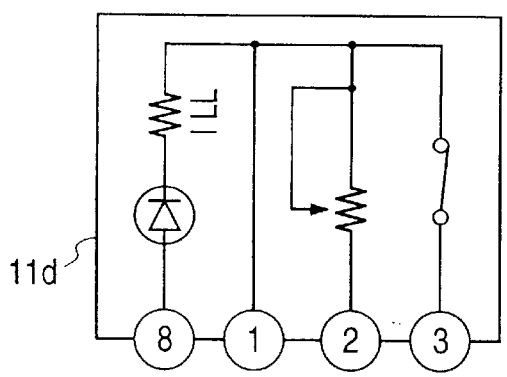
Figure 12:
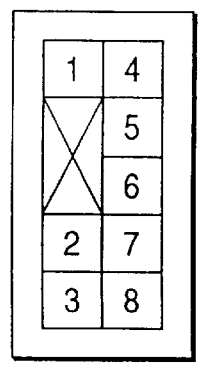
FIG. 12 is a diagrammatic representation showing the layout of terminals of the wire harness connector to be connected to the control switches shown in FIGS. 8A and 8B to FIGS. 11A and 11B.

Figs. 11A and 11B show an on-off switch with a control knob used as a room light. A switching circuit 11*d* is formed between terminals, as shown in FIG. 11B. An on-off switch is formed between terminals 1 and 3, and a control knob is formed between terminals 2 and 1. An LED for illumination purposes (ILL) is connected between terminals 8 and 1 together with a current limiting resistor. When the on-off switch with a control knob is connected to the switch connector SWC-1 of the SW unit 10, the terminal 1 is connected to GND; the terminal 2 is connected to the signal 1; the terminal 3 is connected to the signal 2; and the terminal 8 is connected to the terminal for illumination.

The briefly described units will be described in detail one after another. As previously described, the SW unit 10 having the switch connectors SW1 to SW15 is constructed in the manner as shown in, for example, FIG. 13. The SW unit 10 has a one chip microcomputer ($\mu$COM) 111. The microcomputer 111 incorporates a central processing unit (CPU) 111*a*, ROM 111*b* which holds control programs and fixed data, and RAM 111*c* which have data areas and work areas used when the CPU executes various processing operations.

The switches SWC-1 to SWC-4 used for inputting switch data and control knob data are connected to output and input ports of the microcomputer 111 via interface circuits A112$_1$–112$_4$, respectively. Each of the interface circuits 112$_1$–112$_4$ is provided with three circuit units, i.e., a VR data input I/F 112a, SW data input I/F 112b, and an LED drive circuit 112c, and two registers 112d and 112e which temporarily hold the SW input data and an LED drive output. The switch connectors SW5 to SW39 specifically designed to input switch data are connected to an A/D input port, the output port, and the input port by way of interface circuits B 113$_1$ to 113$_9$, respectively. Each of the interface circuits B 113$_1$ to 113$_9$ has three pairs of circuits, each pair comprising a SW data input I/F 113a and an LED drive circuit 113b, and two registers 113c and 113d which temporarily hold the SW input data and the LED drive output.

A 24-volt power supply of the switch connector SWC-14 which connects the SW unit 10 to the load drive unit A is connected to a 5-volt power reset circuit 116 which feeds 5-volt electric power to each of the units. The 24-volt power supply is further connected to a reset input port of the microcomputer 111 via the 5-volt power reset circuit 116. Further, the switch connector SWC-14 is connected to a TX output port and an RX input port of the microcomputer 111 via a communication IC (TX, RX) 117. The switch connector SWC-15 which connects the SW 10 to the external monitor is connected to input and output ports of the microcomputer 111 via an input and output I/F circuit 118. The SW unit 10 has nonvolatile memory 120 which consists of E$^2$PROM and is connected to input and output ports of the microcomputer 111 via an input and output I/F circuit 119.

Figure 38:
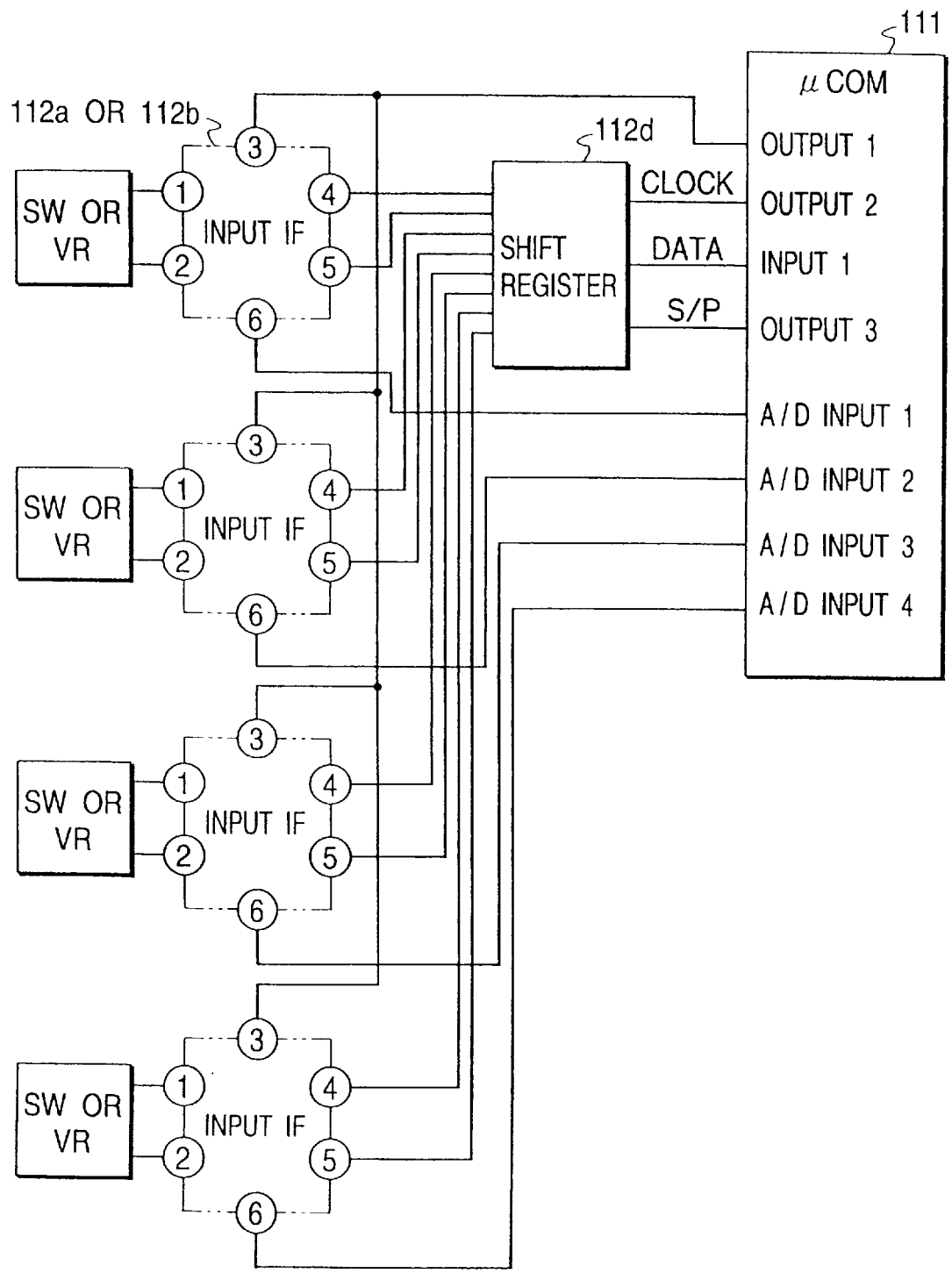
FIG. 38 is a block diagram showing a part of the connection relationship between the SW unit and the control switches.
Figure 39:
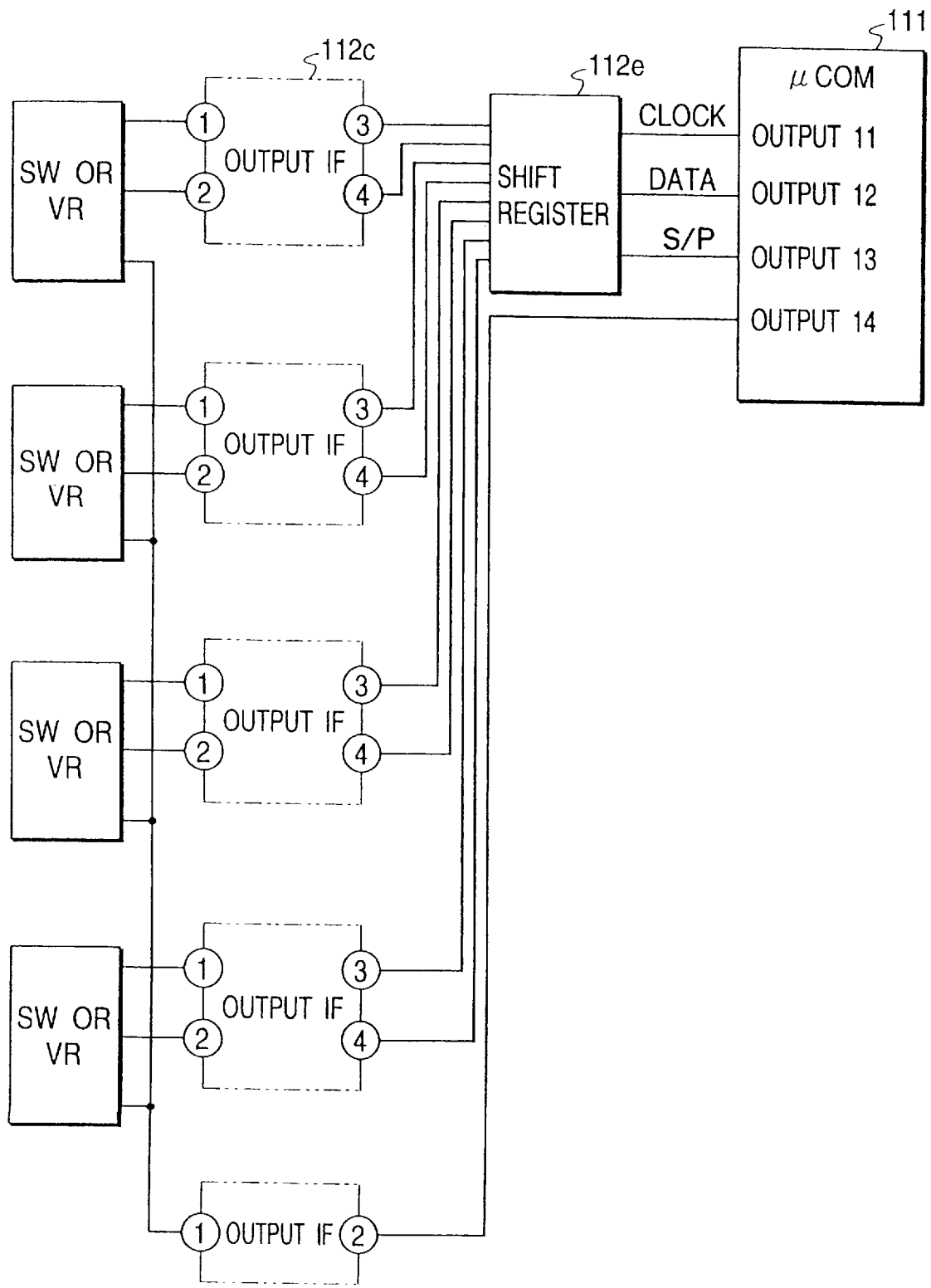
FIG. 39 is a block diagram showing the other part of the connection relationship between the SW unit and the control switches.

FIGS. 38 and 39 show the relationship between the microcomputer 111 and the VR data input I/F 112a, the SW data input I/F 112e, the LED drive circuit 112c, a register 112d which serves as parallel-to-serial converting means, and a register 112d which serves as serial-to-parallel converting means in the previously described SW unit 10. The reading of the VR signal and the on/off signal through the VR data input I/F 112a and the SW data input I/F 112b, and the actuation of the light source via the LED drive circuit 112c will be described in detail hereinbelow.

Figure 40A:
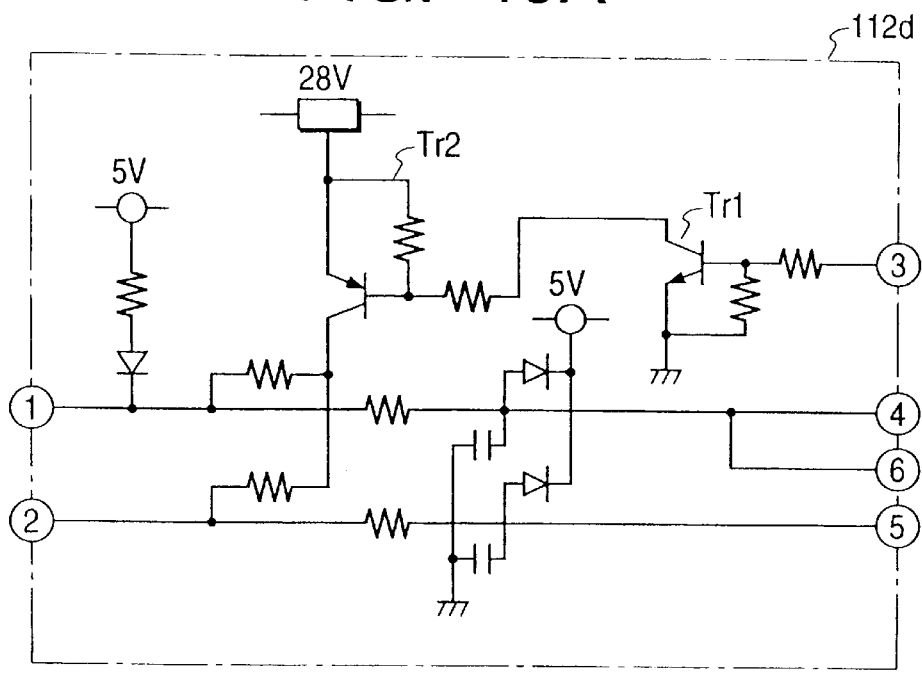
FIG. 40A is a circuit diagram showing one example of the input interface circuit shown in FIG. 38.

Specifically, the VR data input I/F 112a and the SW data input I/F 112b have such a circuit configuration as shown in FIG. 40A. Signals 1 and 2 of the control switches or VR are connected to terminals 1 and 2, and an output port 1 of the microcomputer 111 is connected to a terminal 3. Inputs of the shift register 112d are connected to terminals 4 and 5, and an analog-to-digital input port of the microcomputer 111 is connected to a terminal 6. A clock input, a data output, and a serial-to-parallel (S/P) input of the shift register 112d are connected to an output port 2, an input port 1, and an output port 3 of the microcomputer 111, respectively. In the illustrated circuit, switching transistors Tr$_1$ and Tr$_2$ are turned on as a result of the terminal 3 turning into a high. A 28-volt power supply is applied between the terminals 1 and 4 and between the terminals 2 and 5, and hence these terminals are pulled up to the applied power. At this time, the microcomputer 111 reads the on/off condition of the switch and the volume of VR by reading the states of the terminals 4 to 6. In the circuit diagram, the transistors Tr$_1$ and Tr$_2$ and resistors attached to them constitute a circuit for applying a current of more than a specified level to the external switch. However, if it is unwanted, the circuit may be omitted.

Figure 40B:
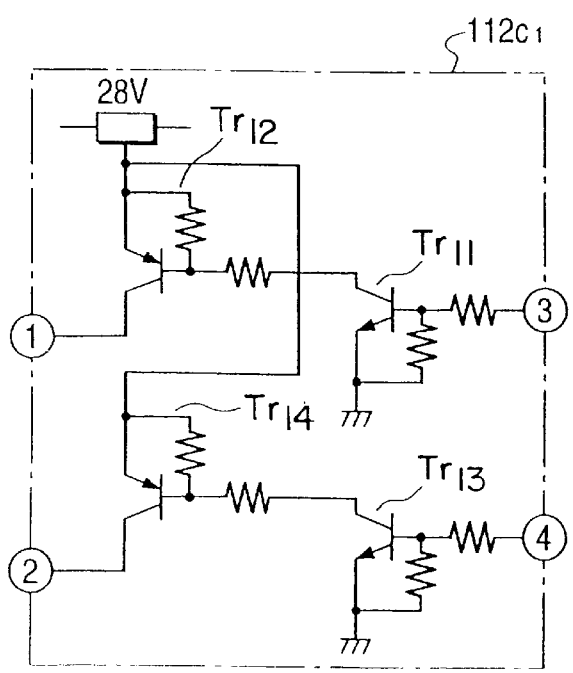
FIGS. 40B and 40C are circuit diagrams showing one example of the output interface circuit shown in FIG. 39.
Figure 40C:
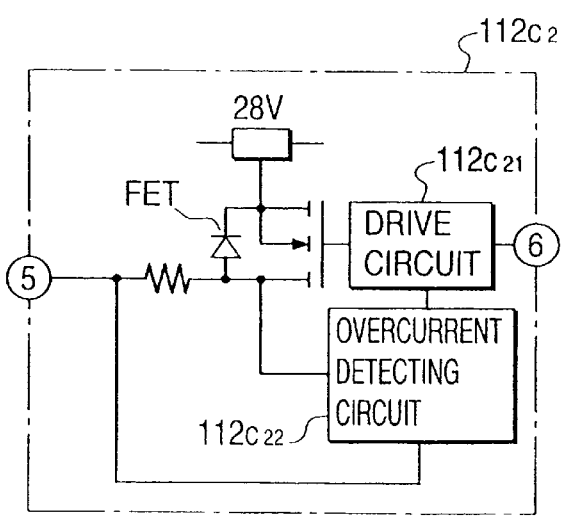

The previously described LED circuit 112c has circuit configurations as shown in FIGS. 40B and 40C. FIG. 40B shows an indicator circuit 112c$_1$, and FIG. 40B shows an illumination circuit. Indicators 1 and 2 of the control switches are connected to terminals 1 and 2, and inputs of the shift register 112d are connected to terminals 3 and 4. A clock input, a data input, and an S/P input of the shift register 112d are connected to output ports 11 to 13 of the microcomputer 111, respectively. A lamp of the control switches is connected to a terminal 5, and an output port 14 of the microcomputer 111 is connected to a terminal 6. In the illustrated circuit, when the terminal 3 turns into a high, switching transistors Tr$_{11}$ and Tr$_{12}$ are turned on, so that the indicator 1 is illuminated. When the terminal 4 turns into a high, switching transistors Tr$_{13}$ and Tr$_{14}$ are turned on, whereby the indicator 2 is illuminated. Further, when the terminal 6 turns into a high, a drive circuit 112$_{C21}$ turns the FET on, so that the lamp is turned on. At this time, if an overcurrent detecting circuit 112C$_{C22}$ which monitors a voltage across both ends of a resistor R detects an overcurrent, the drive circuit 112C$_{C21}$ is stopped.

Figure 14:
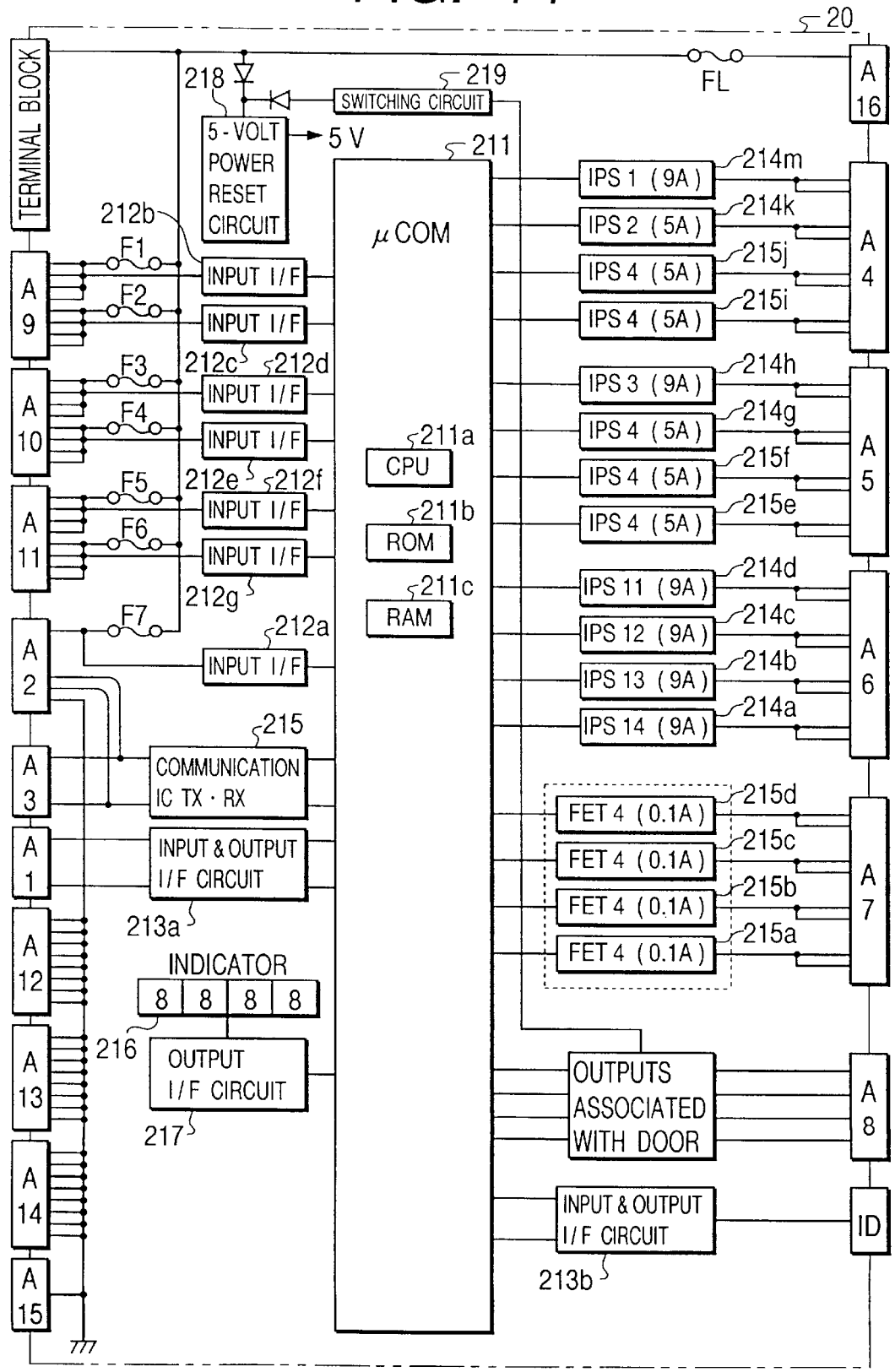
FIG. 14 is a schematic diagram showing the internal configuration of a load drive unit A.

The load drive unit A 20 which is connected to the previously described SW unit 10 via the switch connector SW13 has a one chip microcomputer (μCOM) 211 which operates according to a predetermined control program, in addition to connectors A1 to A16, an ID connector, and a terminal table, as shown in FIG. 14. The microcomputer 211 incorporates an unillustrated central processing unit (CPU), ROM which holds control programs and fixed data, and RAM which has data and work areas used when the CPU executes various processing operations.

A connector A1 is used for providing connection to the external monitor, and a connector A2 is used for connecting the SW unit 10 to the load drive unit A 20. Connectors A4 to A6 are used for driving intelligent power switch (IPS) and floor-side multipurpose loads, and a connector A7 used for producing IPS and relay coil outputs. A connector A8 is used for producing outputs associated with the door, and connectors A9 to A11 are provided with fuses (FUSE) and used for producing a power output. Connectors A12 to A14 are used for connecting the loads to GND. The connector A16 is used for connecting the load drive unit A 20 to the load drive unit B 30. The ID connector is used for the removal attachment of an ID recording medium. The ID recording medium incorporates nonvolatile memory which holds ID data, as will be described later, and consists of E$^2$PROM. The terminal table is used for connecting the load drive unit A 20 to the battery by way of a battery relay.

The load drive unit A 20 further comprises a fusible link FL connected between the terminal table and the connector A16 which connects the load drive unit A 20 to the load drive unit B 30. Moreover, the load drive unit A 20 comprises fuses F1 to F7 connected between the terminal table and the fuse (FUSE) and power output connectors A9 to A11; and input I/F circuits 212a–212g respectively connected between the microcomputer 211 and the connector A2 for connecting the load drive unit A 20 to the SW unit 10, the connector A8 used for producing an output associated with the door, and the fuse (FUSE) and power output connectors A9 to A11. The load drive unit A 20 also comprises an input and output I/F circuit 213a interposed between the connector A1 used for providing connection to the external monitor and the microcomputer 211, and an input and output I/F circuit 213b interposed between the ID connector and the microcomputer 211.

Further, the load drive unit A 20 comprises IPS 214a to 214m respectively connected between the connectors A4 to A6 used for driving the IPS (intelligent power switch) and floor-side multipurpose loads and the microcomputer 211; and FETs 215a to 215d respectively connected between the IPS and relay coil output connector A7 and the microcomputer 211.

The load drive unit A 20 is further provided with a communication IC (TX, RX) 215 connected between a connector 23, which is used for connecting the load drive unit A 20 to the load drive unit B 30, and the microcomputer 211; a four-digit number indicator 216; an output I/F circuit 217 connected between the four-digit number indicator 216 and the microcomputer 211; a 5-volt power reset circuit 218; and a switching circuit 219.

Figure 15:
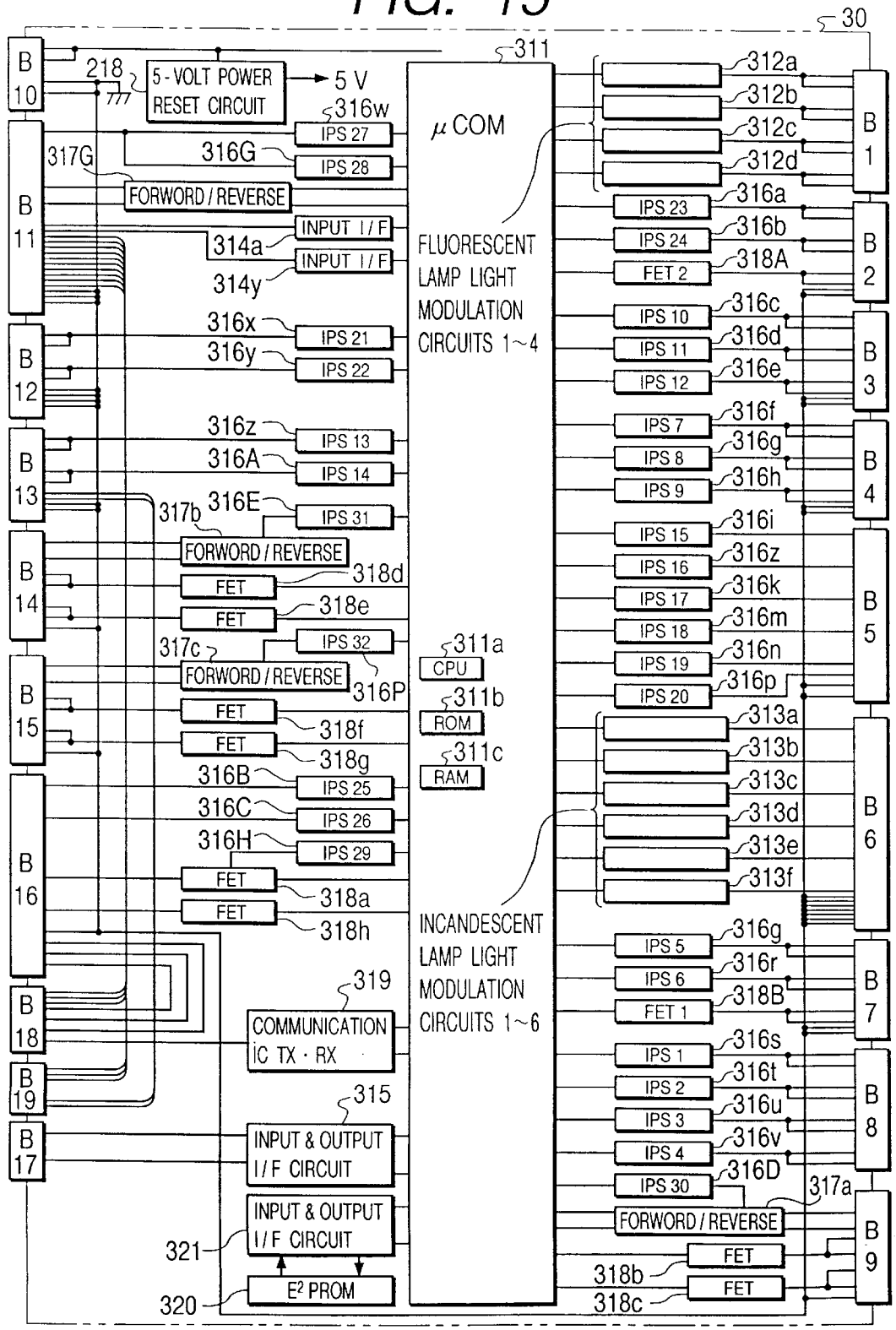
FIG. 15 is a schematic diagram showing the internal configuration of a load drive unit B.

The load drive unit B 30 which is connected to the previously described load drive unit A 20 via the switch connector SW13 has a one chip microcomputer (μCOM) 311 which operates according to a predetermined control program, in addition to connectors B1 to B20, as shown in FIG. 15. The microcomputer 311 incorporates an unillustrated central processing unit (CPU), ROM which holds control programs and fixed data, and RAM which has data and work areas used when the CPU executes various processing operations.

A connector B1 is used for producing a fluorescent lamp light modulation signal, and connectors B2 and B7 are used for producing an IPS/relay coil output. Connectors B3–B5, B8, and B12 are used for producing IPS outputs. Connector B6 is used for producing an incandescent lamp light modulation output. Connectors B9, B14, and B15 are used for producing outputs related to a ventilating fan. A connector B10 is used for connecting the load drive unit B 30 to GND, and a connector B11 is used for providing connection to mirrors and elements associated with them. A connector B13 is used for producing outputs related to IPS and an alarm bell, and a connector B16 is used for producing outputs for IPS, a timer, and the foot lamp. A connector B17 is used for connecting the load drive unit B 30 to the external monitor. A connector B18 is a first connector for connecting the load drive unit B 30 to the load drive unit A 20, and a connector B19 is a second connector for connecting the load drive unit B 30 to a load drive unit A 20.

The load drive unit B 30 further comprises fluorescent lamp light modulation circuits 312a to 312d connected between the connector B1, which produces a fluorescent lamp light modulation output, and the microcomputer 311; incandescent lamp light modulation circuits 313a to 313f connected between the connector B6, which produces an incandescent lamp light modulation output, and the microcomputer 311; input I/F circuits 314a and 314b respectively connected between the connector B11, which provides connection to mirrors and element associated with them, and the microcomputer 311; and an input and output I/F circuit 315 connected between the connector B7, which provides connection to the external monitor, and the microcomputer 311.

Further, the load drive unit B 30 comprises IPS 316a to 316k, 316m, 315n, 316p–316z, and 316A–316Z respectively connected between the microcomputer 311 and the connectors B2 and B7 used for producing IPS and relay coil outputs, the connectors B3–B5, B8, and B12 used for producing IPS outputs, the connector B13 used for producing alarm bell outputs, and the connector B16 used for producing outputs related to the IPSs, the timer, and the foot lamp. The load drive unit B 30 further comprises IPS 316D to 316F and IPS 316m connected between the microcomputer 311 and the connectors B9, B14, and B15 used for producing outputs related to the ventilating fan via forward/reverse rotation control circuits 317a to 317d. The load drive unit B 30 also comprises an IPS 316G connected between the connector B11 used for provided connection to mirrors and elements associated with them and the microcomputer 311 via the forward/reverse rotation control circuits 317a to 317d; and an IPS 316H connected between the connector B16 used for producing outputs related to the IPSs, the timer and the foot lamp and the microcomputer 311 by way of an FET 318a.

The load drive unit B 30 further comprises FETs 318b to 318g connected between the microcomputer 311 and the connectors B9, B14, and B15 used for producing outputs related to the ventilating fan; an FET 318h connected between the microcomputer 311 and the connector B16 used for producing outputs related to the IPSs, the timer, and the foot lamp; a communication IC (TX, RX) 319 connected between the first connector 18 used for connecting the load drive unit B 30 to the load drive unit A 20 and the microcomputer 311; nonvolatile memory 320 which consists of $E^2PROM$ and holds the ID data read from the ID storage medium removably attached to the load drive unit A 20; an input I/F circuit 321 connected between the nonvolatile memory 320 and the microcomputer 311; and a 5-volt reset circuit 322.

Figure 16:
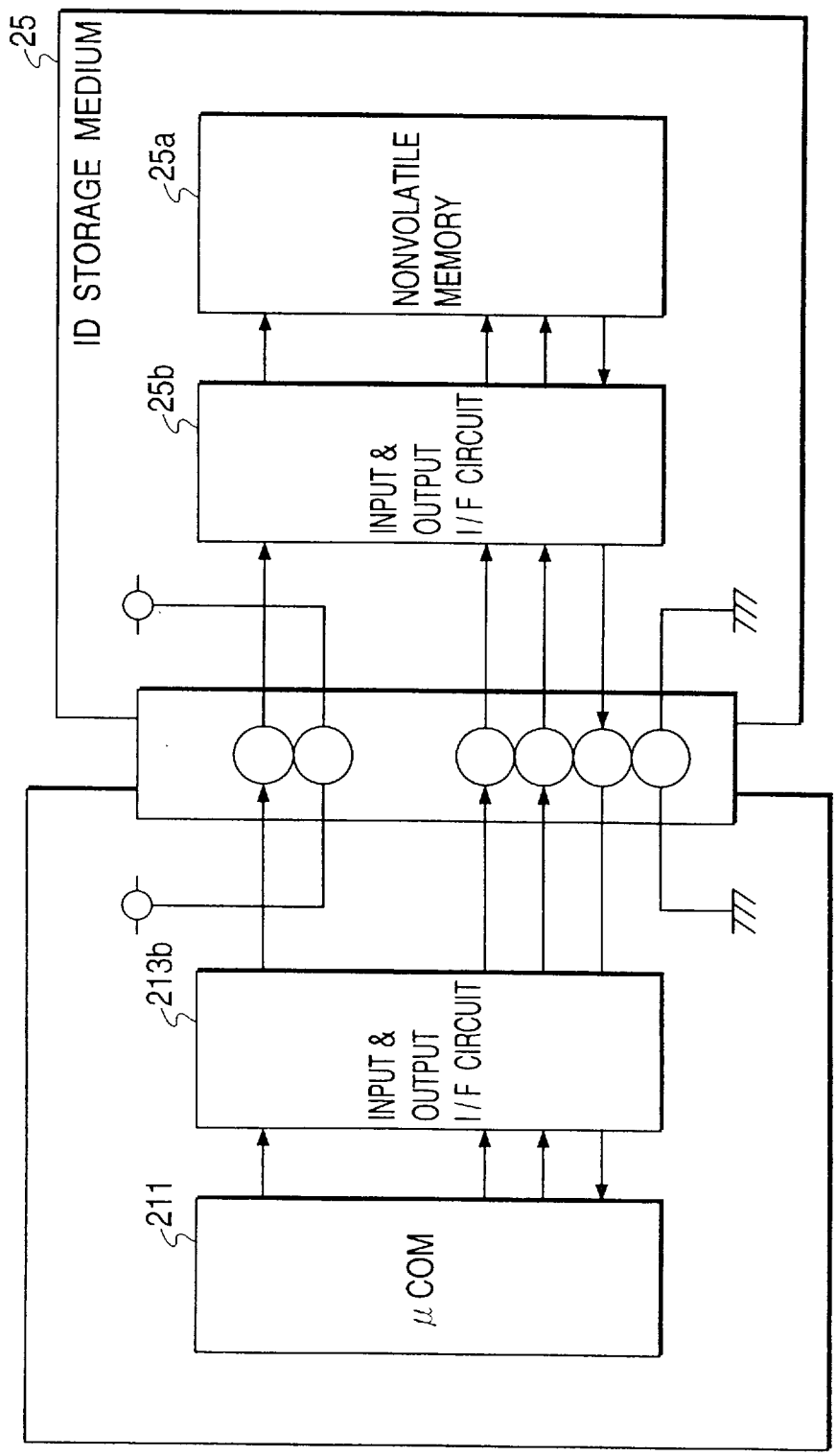
FIG. 16 is a schematic diagram showing the connection between the load drive unit A and a recording medium.

Although omitted from the above descriptions, the ID storage medium 25, shown in FIG. 16, is removably attached to the ID connector of the load drive unit A 20 (FIGS. 8A and 8B). The ID storage medium 25 incorporates the nonvolatile memory 25a which holds the ID data and consists of $E^2PROM$, and an input I/F circuit 25b. The nonvolatile memory 25a holds the ID data such as IPS output control data, relay output control data, output control data related to the door, forward/reverse rotation control circuit output control data, incandescent lamp light modulation output control data, luminescent lamp output control data, upper wiper output control data, a data preparation date, an ID and serial number of a personal computer which prepared the data, and a user code.

As shown in FIG. 17, each of the IPS output control data comprises a data structure, an address of switch and control knob data corresponding to A-IPS (an IPS of the load drive unit A 20) or B-IPS (an IPS of the load drive unit B 30) to which the data are output, data on blinks associated with the selection of a forward contact point, data on an interlocked operation of the door associated with the selection of the forward contact point, data on conditions for the interlocked operation when the door is associated with the selection of the forward contact point, data on blinks associated with the selection of a rearward contact point, data on an interlocked operation of the door associated with the selection of the rearward contact point, data on conditions for the interlocked operation if the door is associated with the selection of the rearward contact point, and default control.

The data structure sets the use of data of both contact points (the forward and rearward contact points) as a result of the input of the switch. Specifically, if 0 is set in the data, only data at the address 0 are used. On the other hand, if 1 is set in the data, data of the switch address (even) at 1 and data of another switch address (odd) defined by subtracting 1 from that switch address are used. FIGS. 18A to for the same, the load is activated together with the closing of the door. The default control is used for setting default control conditions. If 00 is set for the default control, the switch remains in the current condition. If 01 is set for the same, the switch is forcibly turned on. If 10 is set for the same, the switch is forcibly turned off.

As shown in FIG. 19, each of the relay coil output control data comprises a data structure, an address of switch data corresponding to A-RLY (a FET of the load drive unit A 20) or B-RLY (a FET of the load drive unit B 30) to which the data are output, an address of the switch and control knob data, data on blinks associated with the selection of a forward contact point, data on an interlocked operation of the door associated with the selection of the forward contact point, data on conditions for the interlocked operation when the door is associated with the selection of the forward contact point, data on blinks associated with the selection of a rearward contact point, data on an interlocked operation of the door associated with the selection of the rearward contact point, data on conditions for the interlocked operation if the door is associated with the selection of the rearward contact point, and default control. These elements of the relay coil output control data are set under the same conditions as those of the IPS are set. The output control data related to the door has such a data structure as shown in FIG. 20. Corresponding switch data are used for setting the switch which controls the 18D show the selection of the forward and rearward contact points of the switch, and corresponding addresses.

The address of a corresponding switch and control knob data is used for setting an address of the corresponding switch having a control volume. The data on blinks associated with the selection of a forward (or rearward) contact point are used for setting the control of blinks when the forward contact point (or the rearward contact point) is selected as a result of the actuation of the switch. If 0 is set for the blink data, no blinks occur. If 1 is set for the blink data, blinks occur. The data on interlocked operation of the door associated with the selection of the forward contact point are used for setting an interlocked operation of the door when the forward (or rearward) contact point is selected as a result of the actuation of the switch. If 0 is set with regard to the interlocked operation data, the load is not activated together with the action of the door. However, if 1 is set for the same, the load is activated together with the action of the door. The data on conditions for the interlocked operation when the door is associated with the selection of the forward (or rearward) contact point are used for setting conditions for the interlocked operation if the load is activated together with the opening of the door when the forward (or rearward) contact point is selected as a result of the actuation of the switch. If 0 is set for the condition data, the load is activated together with the opening of the door. If 1 is set illumination of the foot lamp. If 00 is set for the corresponding switch data, the foot lamp illuminates in the case of a swing door. If 01 is set for the same, the foot lamp illuminates in the case of a collapsible door. The other setting conditions of the corresponding switch data are the same as those of the IPS. The forward/reverse rotation control circuit output control data are used for forwardly or reversely rotating a motor in order to switch the ventilating fan between a mild operation and an intensive operation or to get the antennal in and out, as shown in FIG. 21.

The incandescent lamp light modulation output data and the fluorescent lamp output control data comprise an address of the corresponding switch data and data on an interlocked operation associated with the door opening, as shown in FIGS. 22 and 23. The setting switch is used for setting an address of the upper wiper ganged switch. If 00 is set for the interlocked operation data, the load is not activated together with the opening of the door. If 01 is set for the same, the load is activated together with the opening of the door. The upper wiper output control data are used for setting an upper wiper ganged switch in such a way that the upper wiper does not operate if the ganged switch is set and the door is opened, as shown in FIG. 24.

The data preparation date and the ID and serial number of the personal computer which prepared the data are used in preparing an ID. The user code is used to set a registration number in four digits when the ID data are prepared, as shown in FIG. 25.

Figure 26:
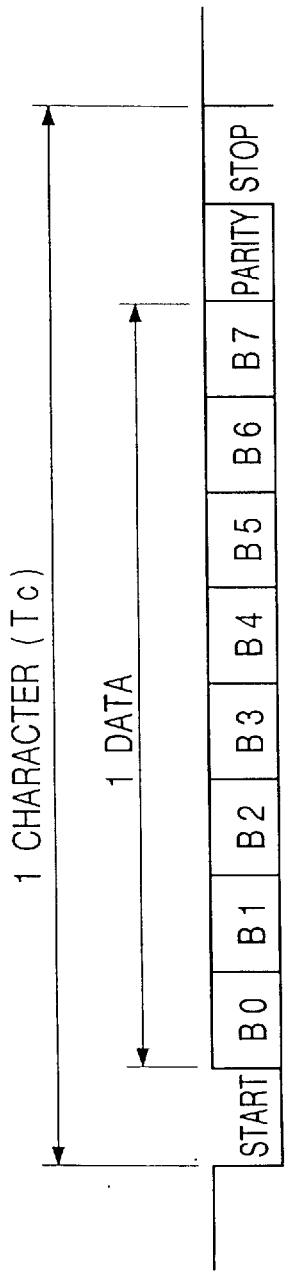
FIG. 26 is a diagrammatic representation showing a character structure to be used in inter-unit communications.
Figures 27A, 27B, 27C, 27D:
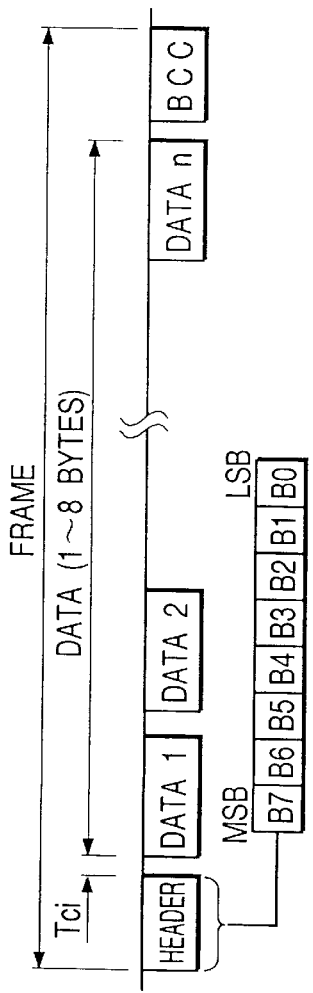
FIGS. 27A to 27D are diagrammatic representations showing a frame structure to be used in the inter-unit communications.

The previously described multiplex communication system employs a centralized control communications protocol which uses the load drive unit A 20 as the master node. The structure of characters of the data comprises one start bit, eight data bits, one parity bit (even), and one stop bit, as shown in FIG. 26. In the drawing, Tc designates a character time. The frame of the data comprises a header, the data (eight bytes), and BCC (block check characters = a checksum), as shown in FIG. 32A. A predetermined interval period Tci is ensured between the characters. In the header, a frame number is made up of B0–B3, as shown in FIG. 27B. A transmission unit ID code is made up of B4 and B5, as shown in FIG. 27C. A communication mode ID code is made up of B6 and B7, as shown in FIG. 27D.

Figure 28:
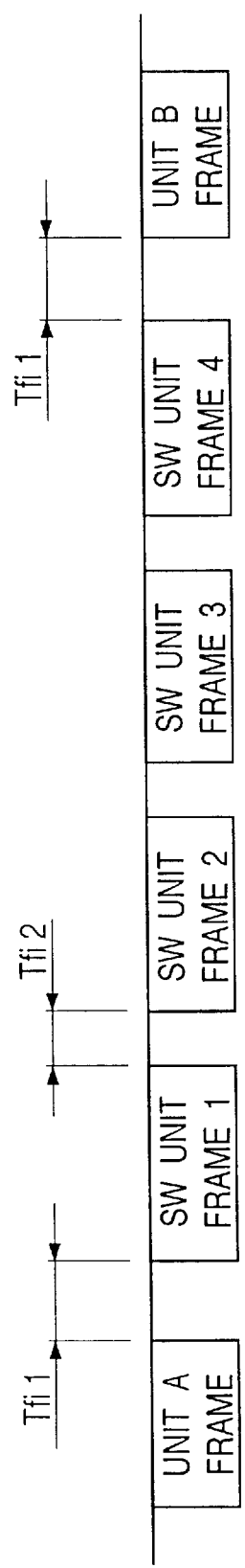
FIG. 28 is a diagrammatic representation for illustrating an interval between frames.

A frame interval time is ensured between the frames, as shown in FIG. 28. Tfi 1 is a frame interval time used when the transmission unit changes from the load drive unit A 20 to the SW unit 10, and, further to, the load drive unit B 30 in the ID data and normal communication modes. Tfi 2 (< Tfi 1) is a frame interval time for the transmission data whose four frames are consecutively transmitted from the SW unit 10 in the normal communication mode.

Figure 29:
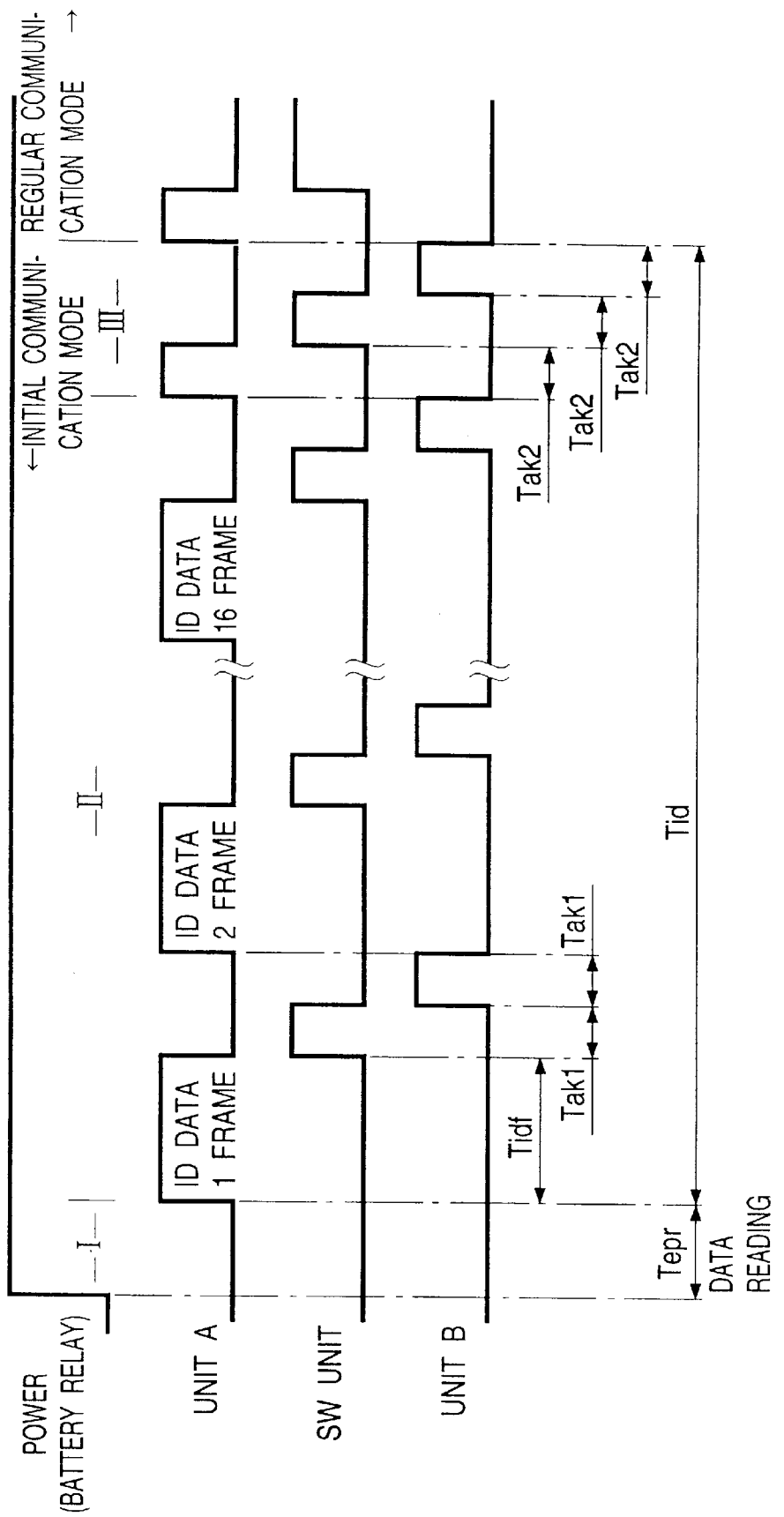
FIG. 29 is a diagrammatic representation showing sending/receiving timing between units in an ID data communications mode.

The inter-unit communication method and, particularly, sending/receiving timing in an initial communication mode in which the ID data are sent will now be described with reference to FIG. 29. After the load vehicle control system has come up, the contents of the nonvolatile memory 10g, 25g, and 30g are stored in the RAM 111c, RAM 211c, and RAM 311c in the respective load control units during a period "I" of a time Tepr in which the E²PROM of the nonvolatile memory reads data. Particularly, the contents of the nonvolatile memory 25a of the ID recording medium 25 in the load drive unit A 20 are consecutively read. When the same data are successively read three times, the data are identified as true ID data, and that data are stored in the RAM 211c.

The load drive unit A 20 separates the contents of the thus read ID data into 16 frames during an ensuring period II. Tidf is a time required to send one frame of the ID data. When the other units, that is, the SW unit 10 and the load drive unit B 30, can normally receive the ID data from the load drive unit A 20, an acknowledgement ACK signal is sent. Tak 1 is a time required to send the acknowledgement ACK signal as responses to the normal receipt of the ID data. The load drive unit A 20 repetitively sends the same frame until it receives the acknowledgement ACK signal from the other units.

During a further ensuing period III, the load drive unit A 20 sends checksum data of the received ID data as a confirmation ACK signal. Tak 2 is a time required to send the confirmation ACK signal for checking all of the ID data. The other units send the check sum data of the ID data received from the load drive unit A 20 as the confirmation ACK signal. If all of the confirmation ACK signals match with each other, the load drive unit A 20 shifts to the normal communication mode. On the other hand, if they do not match with each other, the load drive unit A 20 sends the ID data from its first frame again. If all of the confirmation ACK signals match with each other, the other units compare the received ID data and the contents of the nonvolatile memory fetched and written in the RAM. If the data match with each other, the other units remain as they are. If the data do not match with each other, the contents of the nonvolatile memory are rewritten, and the load drive unit A 20 shifts to the normal communication mode. Tid is a time required to send the ID data. If the confirmation ACK signals do not match with each other, the other load drive units wait for the ID data from the load drive unit A 20.

Figure 30:
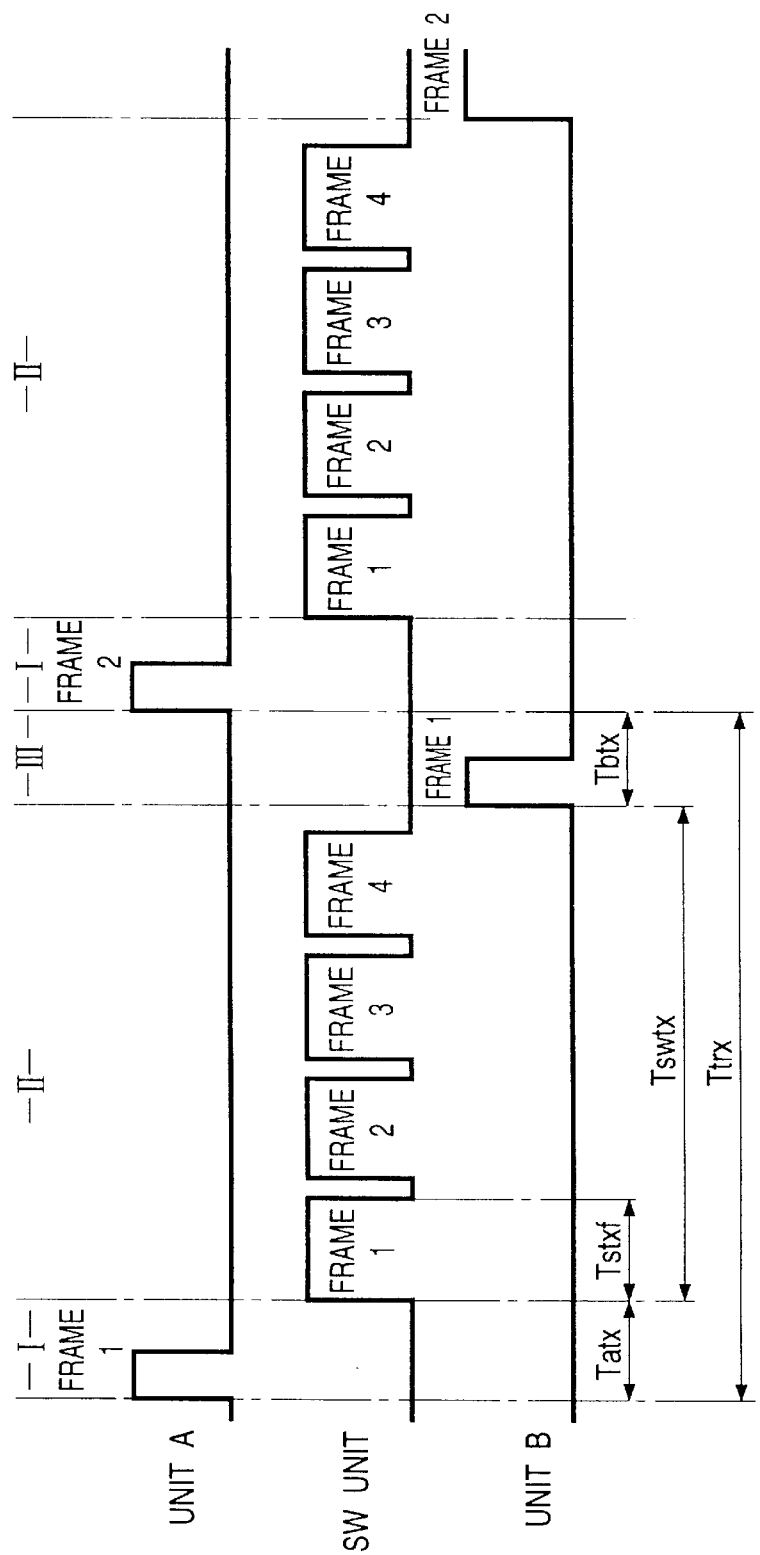
FIG. 30 is a diagrammatic representation showing sending/receiving timing between units in a normal communications mode.

The sending/receiving timing at the time of normal communication will now be described with reference to FIG. 30.

During a period I of a time Tatx which is the normal data transmission time of the load drive unit A 20, the load drive unit A 20 sends input data of an external signal, diagnostic data of the IPSs, and broken fuse data to the other units. Although the input data of the external signal are cyclically sent every time, the diagnostic data of the IPSs and the broken fuse data are divided into seven bytes. The thus divided data are sent at the rate of one byte per transmission. During a period II of a time Tswtx which is the next normal data transmission time of the SW unit 10, the SW unit 10 cyclically sends the switch and control knob data every time. All of the data are divided into four frames, each frame comprising six bytes, and sent during a period of time Tstxf in which the SW unit 10 usually sends one frame of data. During a period III of a time Tbtx in which the load drive unit 30 usually sends data, the load drive unit B 30 sends the input data of the external signal, the diagnostic data of the IPSs, and abnormal output data with regard to the incandescent and fluorescent lamp light modulation circuits. Although the input data of the external signal are cyclically sent every time, all of the diagnostic data of the IPSs and the abnormal output data with regard to the incandescent and fluorescent lamp light modulation circuits are divided into ten bytes. The thus divided data are sent at the rate of one byte per transmission. Ttrx is one cycle in the normal communication mode.

The ID data, which are sent by the load drive unit A 20 to the SW unit 10 and the load drive unit B 30 in the ID communication mode, consists of 16 frames. The contents of the $E^2$PROM are sent in order of address, as shown in FIG. 31. The ID data acknowledgement ACK signal, which the SW unit 10 and the load drive unit 30 send when they have normally received the ID data, comprises solely the header and BCC, as respectively shown in FIGS. 32A and 32B. Therefore, two bytes of the same data are sent.

The ID data confirmation ACK signal which is sent to check the ID data received from the load drive unit A 20 comprises the header, the data, and the BBC, as shown in FIG. 33A. The result of the check of all the ID data is sent as the data. The ID data acknowledgement ACK signal, which the SW unit 10 and the load drive unit 30 send to check the received ID data, comprises the header and BCC, as respectively shown in FIGS. 33A and 33B. The result of the check of all the ID data is sent as the data.

The data which are sent by the load drive unit A 20 in the normal communication mode consists of seven frames. Data 1 of the frames 1 to 5 comprises information with regard to the state of receipt of data from the SW unit 10, the state of receipt of data from the load drive unit B 30, the on/off condition of the battery relay, the on/off condition of the lighting switch, the state of action of the wiper, and the open/closed condition of the door, as shown in FIG. 34A. Data 2 comprises information with regard to a short circuit and an open circuit. The data 1 of the frames 6 and 7 are the same as the frames 1–5 as shown in FIG. 34B. The data 2 of the frame 6 represent the open condition of the fuse (FUSE). The data 2 (not shown) of the frame 7 are backup data.

The data sent from the SW unit 10 comprise four frames. Data 1 to 6 of the frame 1 represent the states of the two signal terminals 7 and 9 of each of the switches SW-1 to SW-24, as shown FIG. 35A. The data 1 to 6 of the frame 2 represent the state of receipt of a signal from the load drive units A 20 and B 30 in addition to the states of the two signal terminals 7 and 9 of each of the switches SW-25 to SW-39 and the state of other specifically designed switched. Data 1 to 6 of the frames 3 and 4 represent values of VR1 to VR12, as shown in FIG. 35C.

The data sent from the load drive unit B 30 comprises ten frames. Data 1 of the frames 1 to 8 represent the state of receipt of a signal from the SW unit 10 and the state of receipt of a signal from the load drive unit A 20, as shown in FIG. 36A. Data 2 represent whether the B-IPSs are in a shortcircuit condition or an open circuit condition. The data 1 of the frames 9 and 10 are the same as the frames 1 to 5, as shown in FIGS. 36A and 36B. The data 2 represent a shortcircuit condition of the incandescent lamp and the fluorescent lamp.

With the previously described configuration, when the vehicle load control system starts operating, the CPU of each microcomputer of each unit reads the ID data stored in the nonvolatile memory disposed in each unit. The CPU then stores the thus read ID data into a predetermined area of the RAM. Subsequently, when any one of the control switches 11₁–11ₙ is actuated, a control signal output as a result of the actuation of the control switch is input to the microcomputer 111 of the SW unit 10, which is connected to the control switch via the sub harness SH, by way of the SW data input I/F 112b and the register 112d. The transmission data consisting of the frames 1 to 4 shown in FIG. 36 are generated on the basis of the thus received control signal. The thus generated transmission data are sent to the load control units A 20 and B 30 from the communication IC 117 over the multiplex transmission line 40. The transmission data are received by the communication ICs 215 and 319 of the load control units A 20 and B 30, and they are stored in predetermined areas in the RAM 211c and the RAM 311c of the microcomputers 211 and 311.

The operations of the load control units A 20 and B 30 that received the transmission data from the SW unit 10 will now be described. Both load control units A 20 and B 30 operate in the same manner, and hence the operation of only the load control unit A 20 will be described. The CPU 211a of the microcomputer 211 of the load control unit A 20 retrieves the ID data stored in the RAM 211c in order of address. If there is an address of the switch data, the data of the data structure in the ID data will be referred. If 1 is set in the data, it is determined whether or not 1, which represents operation, has been set in bits of the data sent from the SW unit 10 corresponding to the address at 1 and another address obtained by subtracting 1 from that address. If1 is set in the bits of the transmission data, the control signal is sent to the corresponding load on the assumption that the switch of the SW unit 10 has been actuated. In referring the control data, it is judged whether or not 1 has been set in the data items in the ID data, namely, blinks associated with the selection of a forward contact point, an interlocked operation of the door associated with the selection of the forward contact point, conditions for the interlocked operation when the door is associated with the selection of the forward contact point, blinks associated with the selection of a rearward contact point, an interlocked operation of the door associated with the selection of the rearward contact point, and conditions for the interlocked operation if the door is associated with the selection of the rearward contact point.

If 1 is set with regard to the blinks associated with the selection of a forward or rearward contact point, the corresponding load is controlled so as not to constantly illuminate but to blink as a result of selection of the forward or rearward contact of the control switch. If 1 is set with regard to the interlocked operation of the door associated with the selection of the forward or rearward contact point, it is judged whether 0 or 1 is set with regard to the conditions for the interlocked operation when the door is associated with the selection of the forward or rearward contact point. If 0 is set with regard to them, the load is activated together with the opening of the door. If 1 is set with regard to them, the load is activated together with the closing of the door. For these reasons, it is determined whether 1 or 0 is set with regard to the door opening in bit B0 of the data 1 of each of the frames 1 to 7 sent from the load drive unit A 20. When the above setting accords with the control setting, the load is actually controlled.

According to the previously described embodiment, the nonvolatile memory 25a and 30g, which are provided as storage means in the load control units A 20 and B 30, store the control data, which are output as a result of the actuation of one of the control switches $11_1$ to $11_n$ and represent the output control state of the corresponding load of the loads $21_1-21_n$ and $31_1-31_n$, so as to correspond to the address of the control switch, as shown in FIGS. 17A and 17B to 21. Upon reference to the control data stored in the nonvolatile memory 25a and 30b, the microcomputers 211 and 311, which act as the control means 20b and 30b, control the electric power fed to the corresponding load on the basis of the received control signal. Therefore, even if the form of the control of the load is modified according to vehicle specifications, it becomes possible for the vehicle load control system to easily cope with the modifications by changing only the control data stored in the nonvolatile memory 25a and 30g.

In the illustrative embodiment, it is possible to freely set the correspondence between the control switch and the load by writing the address of a control switch which actuates the load into the memory address corresponding to the load. As a result, the control data are also set as the data associated with the address of the control switch. The setting of the control data according to the present invention is equivalently applicable to the case where the correspondence between the control switch and the load is fixed by a program. In this case, it is only necessary to set the control data so as to correspond to either the control switch or the load.

The nonvolatile memory 25g is removably incorporated in the load control unit A 20. Hence, when the form of the control of the load is determined according to the vehicle specifications, it is possible for the vehicle load control system to cope with changes in the control form by writing the control data into the nonvolatile memory, and by attaching the storage medium to the load control unit A 20. It becomes possible to attach the storage medium into the vehicle body before its specifications are finally determined. In this way, the present invention is effective in improving the ease of assembly of a vehicle.

The nonvolatile memory 25a previously holds the data which define the correspondence between the control switch and the load to be control as a result of the actuation of the control switch. Therefore, even if the loads are changed according to the vehicle specifications, it becomes possible for the vehicle load control system to cope with the changes by modifying that correspondence data. In terms of this point, the present invention is effective in improving the ease of assembly of the vehicle.

The data which define an interlocked cooperation of the corresponding load with another specific load are also stored as the control data in the nonvolatile memory 25a. The CPUs 211a and 311a of the microcomputers 211 and 311 control the electric power fed to the corresponding load on the basis of the received control signal and the operation signal which is received from the signal input I/F 212n–212q and represents the operating condition of the specific load such as door opening. Hence, it is possible for the vehicle load control system to cope with modifications in the relationship between the loads for interlocked operation, according to the vehicle specifications.

Figure 13:
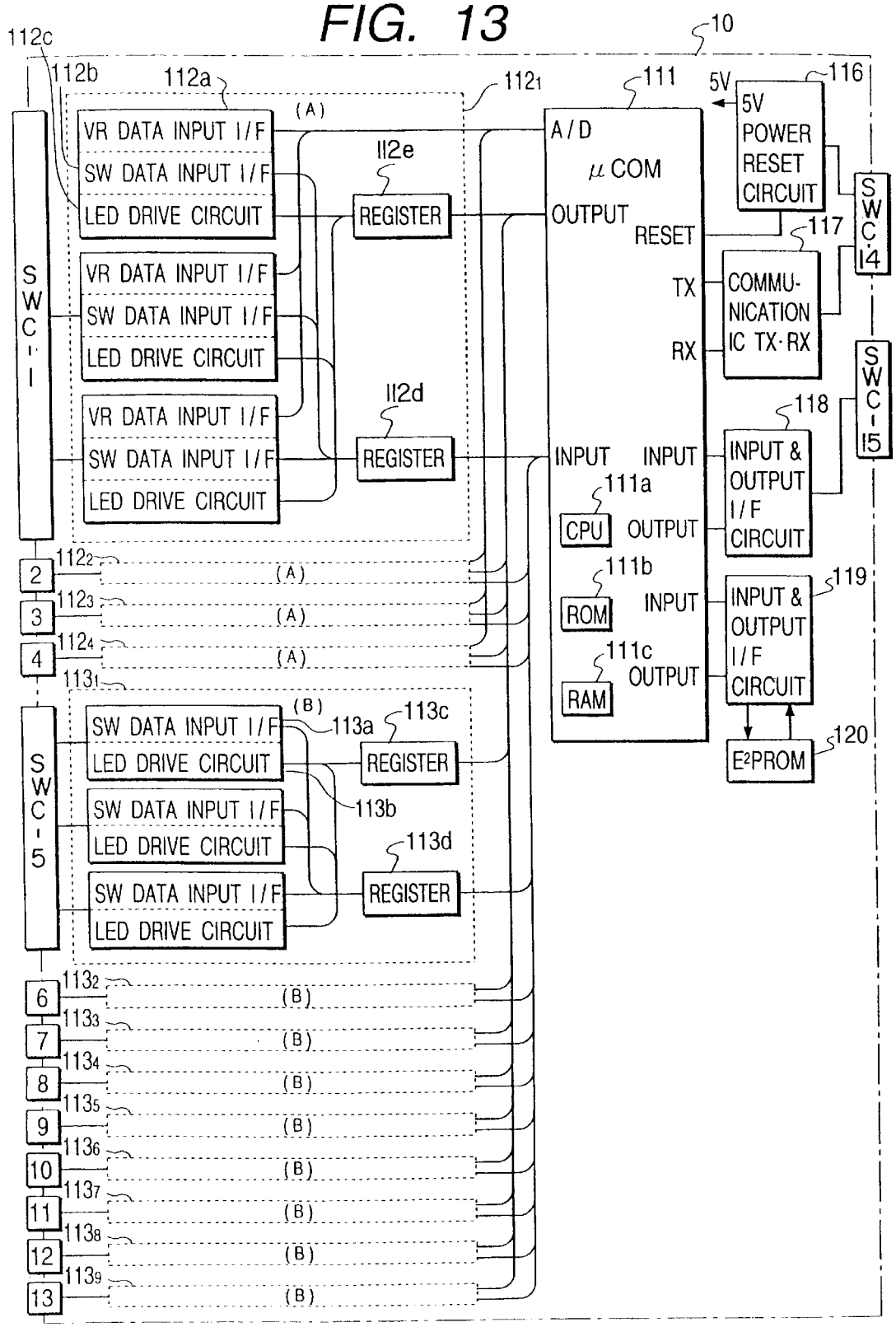
FIG. 13 is a schematic diagram showing the internal configuration of the SW unit.

In the above configuration, the processing which the SW unit 10, described with reference to FIG. 13, carries out according to a preset program will now be described. The CPU 111a of the microcomputer 111 executes processing according to a general flowchart shown in FIG. 41. To begin with, initialization is carried out. In this initializing step, the contents of the RAM 111c are cleared, and an interrupt timer and an internal timer are set. The processing the proceeds to step S2, and the ID data which will be described later in detail are read from the nonvolatile memory 120. The thus read ID data are stored in a predetermined area in the RAM 111c. The processing then proceeds to step S3. It is judged whether or not an ID end flag is 1. The ID end flag is set to 0 when the reading of the data is uncompleted, whereas it is set to 1 when the reading of the data has been completed. The processing is a standby condition in the current loop until that ID end flag becomes 1. However, the receipt of the ID data, the transmission of an acknowledgement, comparison processing, and rewriting of data are executed by interruption.

If YES in step S3, the processing proceeds to step S4. The entry of SW and VR data is carried out with respect to all of the control switches. The detail of the entry of the data will be described later. The processing then proceeds to step S5, and indicator data are processed. In this processing step, the data for controlling the turning on and off action of the indicator are prepared using the SW and VR data, the ID data, and diagnostic data. Details of this processing will be described later. The processing further proceeds to step S6, and illumination data are processed. In this processing step, illumination output data are prepared by an interlocked lighting signal. The processing then proceeds to step S7. In this step, the output data prepared through steps S5 and S6 are actually output.

Figure 41:
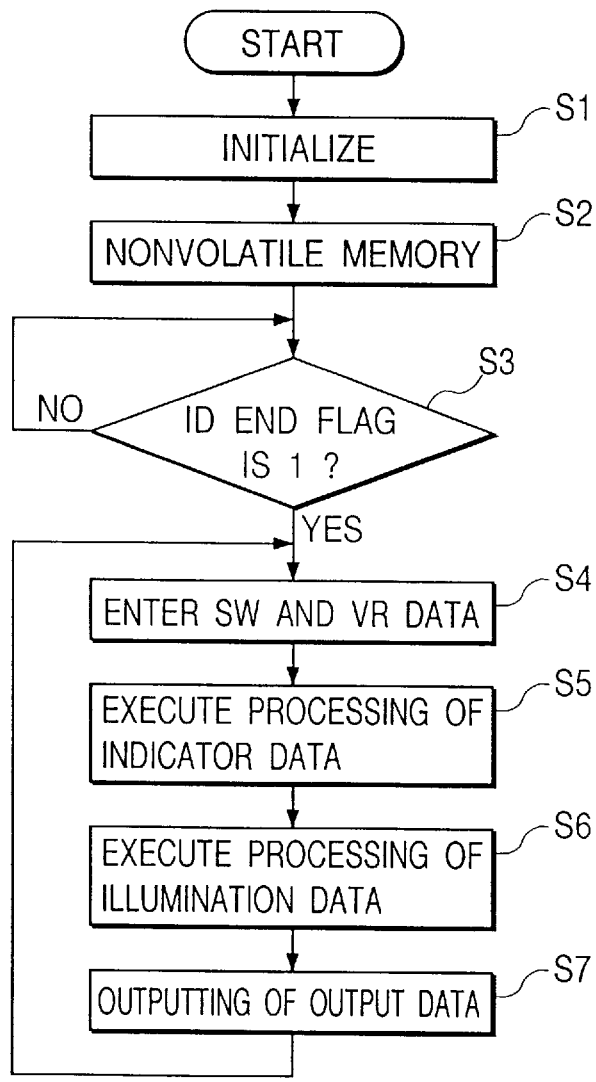
FIG. 41 is a general flowchart showing the processing executed by the CPU in the microcomputer of the SW unit.
Figure 42:
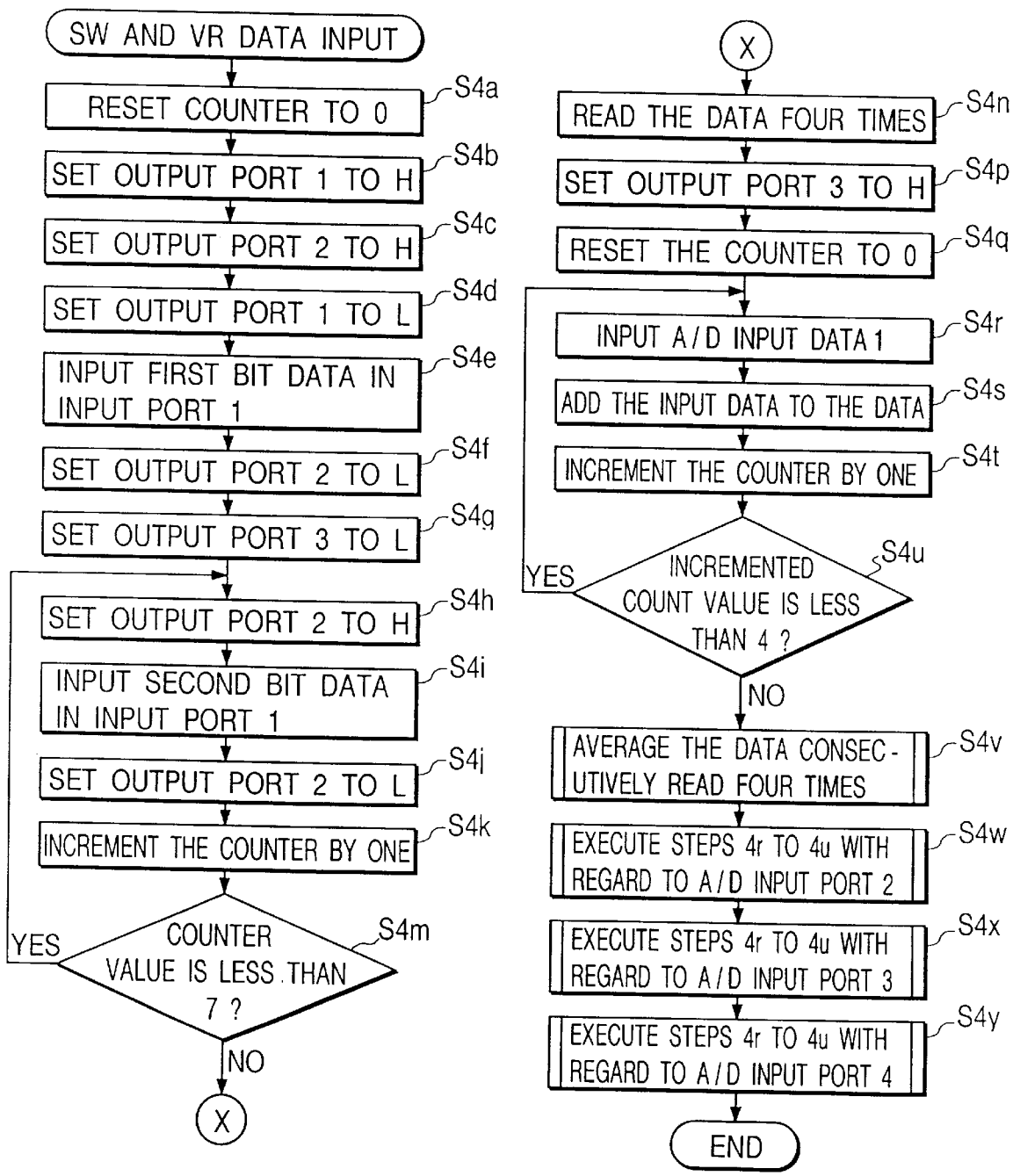
FIG. 42 is a flowchart showing the details of a part of the processing shown in FIG. 41.

With reference to FIG. 42, the details of the entry of the SW and VR data carried out in step S4 of the general flowchart shown in FIG. 41 will now be described. A built-in counter of the RAM 111c is reset to zero in step S4a. An output port 1 of the microcomputer 111, shown in FIG. 38, is set to a high level in step S4b, whereby a pull-up resistor is turned on. In subsequent step S4c, an output port 2 (FIG. 38) is set to a high level, so that the clock input of the shift register 112d is set to a high level. As a result, the input data are latched in the shift register. In short, the control signal is input in a parallel manner. The output port 1 (FIG. 38) is then set to a low level in subsequent step S4d, whereby the pull-up resistor is turned off. In subsequent step S4e, first bit data in the shift register 112d are input to an input port 1 (FIG. 38), and the thus input data are stored in a predetermined area in the RAM 111c. In subsequent step S4f, an output port 2 (FIG. 38) is set to a low level, and the clock input of the shift register is set to a low level. In subsequent step S4g, an output port 3 (FIG. 38) is set to a low level, and a P/S input of the shift register is also set to a low level, whereby the shift register puts itself in a serial mode.

The processing then proceeds to step S4h, and the output port 2 (FIG. 38) is set to a high level. As a result, the clock input of the shift register 112d becomes high, and the processing proceeds to step S4i. In step S4i, data of the next bit in the shift register 112d are input to the input port 1 (FIG. 38). The thus input data are then stored in a predetermined area in the RAM 111c. The thus stored data are used in generating a transmission frame which consists of a plurality of control data items and define the correspondence between the bits and the signal terminals of the switching circuit of each control switch, on the basis of the control signal received from the control switch. In other words, data 1 to 6 of the frame 1 represent the conditions of two signal terminals in each of the switches SW-1 to SW-24, as shown in FIG. 35A. Data 1–6 of the frame 2 represent the states of the two signal terminals and the condition of another switch in each of the switches SW-25 to SW-39, as shown in FIG. 35B. As a result, the length of the transmission data is reduced, which makes it possible to realize high-speed communication.

The processing then proceeds to step S4j, and the output port 2 is set to a high level, so that the clock input of the shift register 112d is set to a low level. In subsequent step S4k, the counter is incremented. In ensuing step S4m, whether or not the count value is less than 7. If YES in step S4m, the return to step S4h takes place. Steps 4h to 4m are repetitively executed until the decision made in step S4m becomes NO. In consequence, the control signal input to the shift register 112d in a parallel form is converted into a serial signal, and the thus converted serial signal is output. Therefore, it becomes possible for the microcomputer 111 having a smaller number of input ports to cope with the parallel signal.

If NO in step S4m, the processing proceeds to step S4n. Then, the data are read four times. In the processing carried out in step S4n, the data are compared to the data which were read three times before the currently read data, and the current data are determined as true data if all of these data items have been judged as being identical with each other. Subsequently, the processing proceeds to step S4p, and the output port 3 (FIG. 38) is set to a high level. As a result, the S/P input of the shift register 112e becomes high, and the shift register puts itself into a parallel mode. In ensuing step S4q, the counter is reset to 0, and the processing proceeds to step S4r. In this step, the data of the A/D input port 1 are input. In subsequent step S4s, the input data are added to the data, and the processing proceeds to step S4t. In this step, the counter is incremented, and it is judged in step S4u whether or not the incremented count value is less than 4. If YES in step S4u, the return to step S4r takes place. Then, the steps S4r to S4u are repetitively executed until the decision made in step S4u becomes NO. If NO in step S4u, the processing proceeds to step S4v. The data which were consecutively read four times are averaged. The thus obtained mean data are utilized in generating data 1–6 of the frames 3 and 4 of the data sent from the SW unit 10, that is, information representing the values of VR1 to VR12, as shown in FIG. 35.

The processing then proceeds to steps S4w to S4y, and the processing equivalent to that in the steps S4r to S4u is carried out with respect to each of the A/D input ports 2 to 4 (FIG. 38). The sequence of SW and VR input processing is now completed. Data 1 to 6 of the frame 1 of the stored data represent the conditions of the two signal terminals 7 and 9 of each of the switches SW-1 to Sw-24, as shown in FIG. 35A. Data 1–6 of the frame 2 represent the state of receipt of signals from the load drive units A and B, in addition to the conditions of the two signal terminals 7 and 9 and other switches of each of the switches SW-25 to SW-39, as shown in FIG. 35B. Data 1–6 of frames 3 and 4 represent values of VR1 to VR12, as shown in FIG. 35B.

Figure 43:
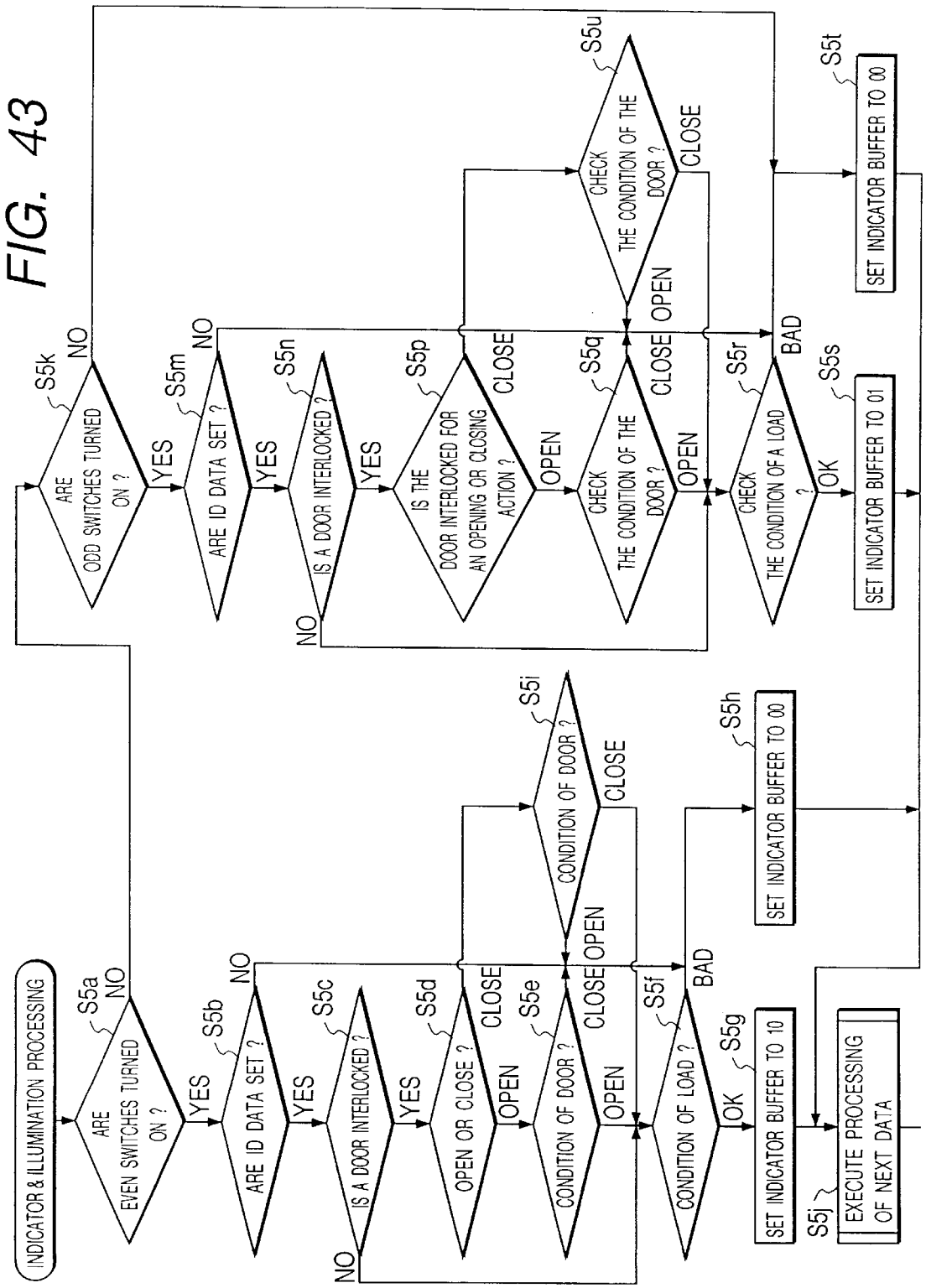
FIG. 43 is a flowchart showing the details of another part of the processing shown in FIG. 41.

The details of processing of the indicator and illumination data carried out in steps S5 and S6 in the general flowchart shown in FIG. 41 will be described with reference to FIG. 43. In step S5a, the on/off condition of the switches input in step S4 in the general flowchart is checked. To begin with, it is checked whether or not the even switches are turned on. If YES in S5a, that is, if the even switches are turned on, the processing proceeds to step S5b. In that step, it is checked whether or not the ID data are set. If it has been determined in step S5b that the ID data are set, the processing proceeds to step S5c. In step S5c, it is checked whether or not the door is interlocked. If YES in step S5c, that is, an interlocked operation is set with regard to the door, the processing proceeds to step S5d. In step S5d, it is checked whether the interlocked operation is associated with the opening or closing action of the door. If it has been determined in step S5d that the interlocked operation is associate with the opening action of the door, the processing proceeds to step S5e. In step S5e, it is checked whether the door is closed or open. If it has been determined in step S5e that the door is open, an indicator buffer formed in a predetermined area of the RAM 111c is set to 10 in step S5g.

If it has been determined in step S5b that the data are not set, that is, the ID data of the current SW are not set, the processing proceeds to step S5h. In this step, the indicator buffer formed in the predetermined area of the RAM 111c is set to 00. If it has been determined in step S5c that the door is not interlocked, that is, no interlocked operation is set with regard to the door, the processing bypasses steps S5d and S5e and directly proceeds to step S5f. If it has been determined in step S5d that the interlocked operation is associated with the closing action of the door, the processing proceeds to step S5i, and it is judged whether the door is closed or open. If the door is judged as being closed, the processing proceeds to step S5f. On the other hand, if the door is judged as being open, the processing proceeds to step S5h. Further, even if the door is judged as being closed in step S5e, the processing still proceeds to step S5h. After the completion of the processing in steps S5g and S5h, the processing proceeds to step S5j. Then, the processing of the next switching data are executed.

On the other hand, if NO in step S5a, the processing proceeds to step S5k. In this step, it is judged whether or not the odd switches SW are turned on. If YES in S5a, that is, if the odd switches are turned on, the processing proceeds to step S5m. In that step, it is checked whether or not the ID data are set. If it has been determined in step S5m that the ID data are set, the processing proceeds to step S5n. In step S5n, it is checked whether or not the door is interlocked. If YES in step S5n, that is, an interlocked operation is set with regard to the door, the processing proceeds to step S5p. In step S5p, it is checked whether the interlocked operation is associated with the opening or closing action of the door. If it has been determined in step S5p that the interlocked operation is associate with the opening action of the door, the processing proceeds to step S5q. In step S5q, it is checked whether the door is closed or open. If it has been determined in step S5q that the door is open, the indicator buffer formed in the predetermined area of the RAM 111c is set to 01 in step S5r.

If it has been determined in step S5m that the data are not set, that is, the ID data of the current SW are not set, the processing proceeds to step S5t. In this step, the indicator buffer formed in the predetermined area of the RAM 111c is set to 00. If it has been determined in step S5n that the door is not interlocked, that is, no interlocked operation is set with regard to the door, the processing bypasses steps S5p and S5q and directly proceeds to step S5r. If it has been determined in step S5p that the interlocked operation is associated with the closing action of the door, the processing proceeds to step S5u, and it is judged whether the door is closed or open. If the door is judged as being closed, the processing proceeds to step S5r. On the other hand, if the door is judged as being open, the processing proceeds to step S5t. Further, even if the door is judged as being closed in step S5q, the processing still proceeds to step S5t. After the completion of the processing in steps S5s and S5t, the processing proceeds to step S5j. Then, the processing of the next switching data are executed. Further, if NO in step S5k, the processing proceeds to step S5t. In this step, the indicator buffer formed in the predetermined area of the RAM 111c is set to 00, and the processing proceeds to step S5j. Then, the processing of the next data is carried out.

Figure 44:
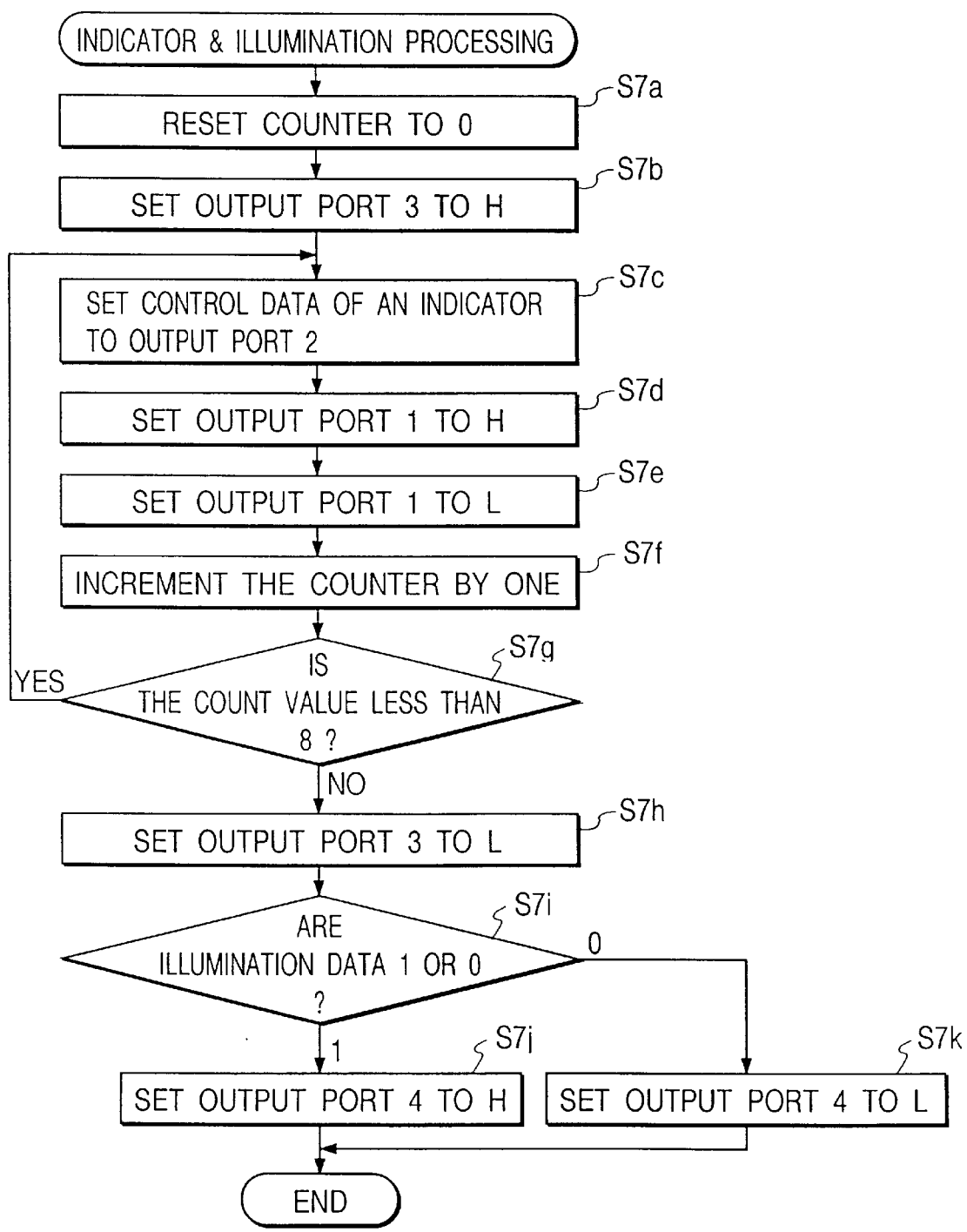
FIG. 44 is a flowchart showing the details still another part of the processing shown in FIG. 41.
Figure 45:
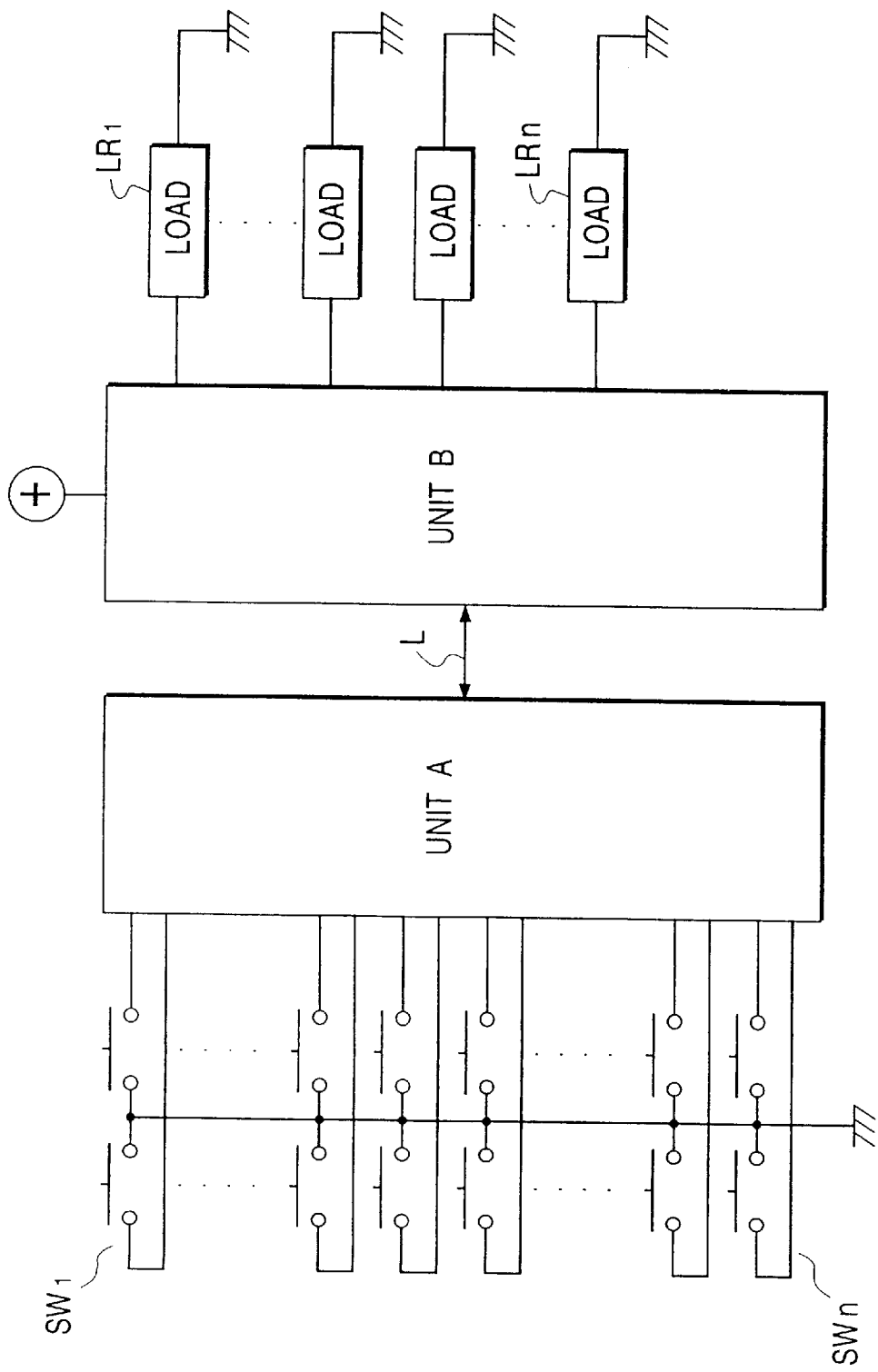
FIG. 45 is a schematic diagram showing one example of a conventional vehicle load control system.

The details of processing of the indicator and illumination data carried out in step S7 in the general flowchart shown in FIG. 41 will be described with reference to FIG. 44. In step S7a, the counter formed in the RAM 111c is reset to 0. In ensuing step S7b, the output port 3 (FIG. 39) is set to a high level, whereby the shift register 112e (FIG. 39) puts itself into a serial mode. The processing then proceeds to step S7c, and the control data of the indicator are set in the output port 2 (FIG. 39). Then, the processing proceeds to step S7d, and the output port 1 (FIG. 39) is set to a high level, whereby the clock input is set to a high level. In ensuring step S7e, the output port 1 (FIG. 39) is set a low level, and the clock input is set to a low level. The processing proceeds to step S7f, and the counter is incremented. Then, the processing proceeds to step S7g. In this step, it is judged whether or not the count value is less than eight. Based on the judgement of this step, it is acknowledged that the eighth bit has already been output. If YES in step S7g, that is, the eighth bit has not been output yet, the return to the step S7c takes place. The steps S7c to S7g are repetitively executed until the decision made in step S7g becomes NO.

If NO in step S7g, the processing proceeds to step S7h, and the output port 3 (FIG. 39) is set to a low level. As a result, the P/S input of the shift register 112e becomes low, and the shift register 112e puts itself into a parallel mode. In subsequent step S7i, it is decided whether the illumination data are 1 or 0. If the illumination data are 1, the processing proceeds to step S7j, and the output port 4 (FIG. 39) is set to a high level. On the other hand, if the illumination data are 0, the processing proceeds to step S7k, and the output port 4 (FIG. 39) is set to a low level. As a result, the lamp is turned on and off, and the output processing of the indicator and illumination data is now completed.

In the above described embodiment, each of the control switches $11_1$–$11_n$ comprises one switching circuit 11a to 11c selected from a plurality of types of switching circuit which share a plurality of signal terminals, as shown in FIG. 8 to 10. Those control switches $11_1$–$11_n$ and the multiplex processing section 10 are connected to each other by means of the plurality of wire harness SH having the identical structure. However, the nonvolatile memory units 25a and 30g of the load control sections 20 and 30 hold the configuration data representing the configuration of the switching circuit of the control switch, so as to correspond to each of the loads. Hence, the control means 20b and 30b of the load control sections 20 and 30 can control the electric power fed to the corresponding load on the basis of the received control signal with reference to the configuration data stored in the nonvolatile memory units 25a and 30g.

The wire harness SH which is as many as the three control switches connected to the wire harness SH by way of connectors $C_1$ to $C_3$ are tied in one connector C, and the thus bundled wire harness SH is connected to the SW unit 10. In consequence, the number of wire harness and the number of connectors used in the SW unit 10 are reduced, which in turn makes it possible to improve operability and to realize the compact SW unit 10.

As described above, according to the present invention, the control data, representing the form of control of a corresponding load which is controlled as a result of the actuation of the control switch, are stored according to the control switches. Electric power fed to the corresponding load is controlled on the basis of the received control signal with reference to the stored control data. As a result, it is possible for a load vehicle control system to cope with changes in the form of control of the loads according to vehicle specifications without troublesome management of parts and cost increase by changing only the control data stored in the storage means.

The control data are stored in the nonvolatile memory built into the storage medium which is removably attached to the load control unit. Hence, when the form of the control of the load is determined according to the vehicle specifications, it is possible for the vehicle load control system to cope with changes in the control form by writing the control data into the nonvolatile memory, and by attaching the storage medium to the load control unit. In this way, the present invention makes it possible to improve the ease of assembly of a vehicle.

The storage means, which maintain the control data, previously hold the data which define the correspondence between the control switch and the load to be control as a result of the actuation of the control switch. Therefore, even if the loads are changed according to the vehicle specifications, it becomes possible for the vehicle load control system to cope with the changes by modifying that correspondence data. Consequently, the ease of assembly of a vehicle can be improved.

Further, the vehicle load control system is provided with data which define interlocked operations associated with a specific load. The electric feed to the corresponding load is controlled on the basis of the control signal and the operation signal which is received from the signal input means and represents the operating condition of the specific load. Therefore, it is possible for the vehicle load control system to cope with modifications in the interlocked operation between the loads according to the vehicle specifications.

As described above, according to the present invention, the configuration data representing the configuration of the switching circuit of the control switch are stored so as to correspond to each of the loads. Hence, it is possible to control the electric power fed to the corresponding load on the basis of the received control signal with reference to the configuration data. Therefore, even if the number of, and the number of types of, control switches associated with a vehicle system increase, it becomes possible to standardize the wire harness without deteriorating the ease of assembly of the wire harness and a cost increase by preventing an increase in the number of types of wire harness for connection purposes as well as preventing the complication of the wire harness.

The wire harness SH which is as many as the plurality of control switches are tied in one connector, and the thus bundled wire harness SH is connected to the multiplex processing section. In consequence, the number of wire harness and the number of connectors used in the multiplexing section are reduced, which in turn makes it possible to improve operability and to realize a compact multiplex processing section.

The on/off conditions of signal terminals of the switching circuits of the control switches are simultaneously read as control signals, and the thus read control signals are converted into a serial signal. As a result, the number of inputs into the control means is reduced. In the light of this point, it is also possible to reduce the size of the multiplex processing section as well as to improve the ease of assembly of the wire harness.

A transmission frame is generated which is composed of a plurality of control data items and previously defines the correspondence between bits and the signal terminals of the switching circuit of each control switch, so that the length of transmission data is reduced. Hence, high-speed communication becomes feasible.

What is claimed is:

1. A vehicle load control system comprising:
   a control section having a plurality of control switches and generating control signals corresponding to the actuation of each of the control switches;
   a multiplex processing section multiplexing the control signals received from the control section to form a multiplexed control signal and sending the multiplexed control signal to a multiplex transmission line; and
   a load control section receiving the multiplexed control signal sent over the multiplex transmission line and controlling electric power fed to loads connected to the load control section on the basis of the multiplexed control signal, the load control section including:
      storage means for holding output control data corresponding to each of the plurality of control switches, the output control data representing the form of control actuation of each of the control switches has on a corresponding one of the loads; and
      control means for controlling the electric power fed to each of the loads on the basis of the multiplexed control signal and the output control data stored in the storage means.

2. The vehicle load control system as defined in claim 1, wherein the storage means which holds the output control data is removably attached to the load control section and comprises a nonvolatile memory.

3. The vehicle load control system as defined in claim 1 or 2, wherein the output control data held in the storage means specify correspondences between the control switches and the respective loads controlled by the control switches.

4. The vehicle load control system as defined in claim 1 or 2, wherein the load control section includes signal input means for permitting input of an operating signal which represents an operating condition of a specific load;
   wherein the storage means holds data for specifying an interlocked operation associated with the specific load; and
   wherein the control means controls the electric power fed to the specific load on the basis of the multiplexed control signal and the operating signal input via the signal input means.

5. A vehicle load control system comprising:
   a control section having a plurality of control switches arranged in a control panel and generating control signals corresponding to the actuation of each of the control switches;
   a multiplex processing section multiplexing the control signals received from the control section to form a multiplexed control signal and sending the multiplexed control signal to a multiplex transmission line; and
   a load control section receiving the multiplexed control signal sent over the multiplex transmission line and controlling electric power fed to loads connected to the load control section on the basis of the multiplexed control signal, the load control section including:
      storage means for holding configuration data representing the configuration of the switching circuit of each of the control switches and a correspondence of each control switch to one of the loads; and
      control means for controlling the electric power fed to each of the loads on the basis of the multiplexed control signal and the configuration data stored in the storage means,
      wherein each of the plurality of control switches incorporates one switching circuit selected from a plurality of types of switching circuit, and the plurality of control switches are connected to the multiplex processing section by a plurality of wire harnesses, each of the plurality of wire harnesses having the same structure.

6. The vehicle load control system as defined in claim 5, wherein each switching circuit incorporated in a control switch is a type of switching circuit selected from the group consisting of: a hold type single throw switch, a hold type double throw switch with an intermediate off position, and a momentary type double throw switch with an intermediate off position.

7. The vehicle load control system as defined in claim 5 or 6, wherein each the plurality of wire harnesses are connected to a corresponding one of the plurality of control switches by way of connectors, the plurality of wire harnesses being bundled together and tied into a common connector, and the thus bundled wire harnesses are connected to the multiplex processing section by means of the common connector.

8. The vehicle load control system as defined in claim 5 or 6, wherein the multiplex processing section has parallel-to-serial converting means which simultaneously receives the on/off conditions of signal terminals of the switching circuits of the control switches as control signals, and which converts the control signals into a serial signal.

9. The vehicle load control system as defined in claim 5 or 6, wherein the multiplex processing section has control data generating means for generating a transmission frame which is composed of a plurality of control data items and defining a predetermined correspondence between bits of the transmission frame and signal terminals of the switching circuit of each control switch, the transmission frame being generated on the basis of the control signals received from the control section.

10. The vehicle load control system as defined in claim 3, wherein the load control section includes signal input means for permitting input of an operating signal which represents an operating condition of a specific load;
   wherein the storage means holds data for specifying an interlocked operation associated with the specific load; and
   wherein the control means controls the electric power fed to the specific load on the basis of the multiplexed control signal and the operating signal input via the signal input means.

11. The vehicle load control system as defined in claim 7, wherein the multiplex processing section has parallel-to-serial converting means which simultaneously receives the on/off conditions of signal terminals of the switching circuits of the control switches as control signals, and which converts the control signals into a serial signal.

12. The vehicle load control system as defined in claim 7, wherein the multiplex processing section has control data generating means for generating a transmission frame which is composed of a plurality of control data items and defining a predetermined correspondence between bits of the transmission frame and signal terminals of the switching circuit of each control switch, the transmission frame being generated on the basis of the control signals received from the control section.

13. The vehicle load control system as defined in claim 8, wherein the multiplex processing section has control data generating means for generating a transmission frame which is composed of a plurality of control data items and defining a predetermined correspondence between bits of the transmission frame and signal terminals of the switching circuit of each control switch, the transmission frame being generated on the basis of the control signals received from the control section.

14. A vehicle load control system comprising:

a control section having a plurality of control switches and generating control signals corresponding to the actuation of each of the control switches;

a multiplex processing section multiplexing the control signals received from the control section to form a multiplexed control signal and sending the multiplexed control signal to a multiplex transmission line; and a load control section receiving the multiplexed control signal sent over the multiplex transmission line and controlling electric power fed to loads connected to the load control section on the basis of the multiplexed control signal, the load control section including:

nonvolatile storage means for holding predetermined data;

means for visually displaying at least a portion of the predetermined data stored in the nonvolatile storage means; and control means for controlling the electric power fed to each of the loads on the basis of the multiplexed control signal and the predetermined data stored in the nonvolatile storage means.

* * * * *